(12) United States Patent
Bhattacharya et al.

(10) Patent No.: US 11,050,557 B2
(45) Date of Patent: Jun. 29, 2021

(54) KEY AGREEMENT DEVICES AND METHOD

(71) Applicant: KONINKLIJKE PHILIPS N.V., Eindhoven (NL)

(72) Inventors: Sauvik Bhattacharya, Einhdhoven (NL); Oscar Garcia Morchon, Eindhoven (NL); Ludovicus Marinus Gerardus Maria Tolhuizen, Waalre (NL); Ronald Rietman, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 50 days.

(21) Appl. No.: 16/611,702

(22) PCT Filed: May 2, 2018

(86) PCT No.: PCT/EP2018/061089
§ 371 (c)(1),
(2) Date: Nov. 7, 2019

(87) PCT Pub. No.: WO2018/206344
PCT Pub. Date: Nov. 15, 2018

(65) Prior Publication Data
US 2020/0153618 A1    May 14, 2020

(30) Foreign Application Priority Data
May 10, 2017    (EP) ..................................... 17170508

(51) Int. Cl.
*H04L 9/08*    (2006.01)
*H04L 9/14*    (2006.01)
*H04L 9/30*    (2006.01)

(52) U.S. Cl.
CPC .......... *H04L 9/0838* (2013.01); *H04L 9/0819* (2013.01); *H04L 9/0858* (2013.01); *H04L 9/14* (2013.01); *H04L 9/3026* (2013.01)

(58) Field of Classification Search
CPC ... H04L 9/0819; H04L 9/0838; H04L 9/0841; H04L 9/0858; H04L 9/14; H04L 9/3026
See application file for complete search history.

(56) References Cited

U.S. PATENT DOCUMENTS 9,673,977 B1 *   6/2017   Kalach ................. H04L 9/0869
9,698,986 B1 *   7/2017   Gutoski ................ H04L 9/0838
(Continued)

FOREIGN PATENT DOCUMENTS

WO    2018083075 A1    5/2018
WO    2018149912 A1    8/2018

OTHER PUBLICATIONS

Search Query Report from IP.com (performed Feb. 24, 2021) (Year: 2021).*

(Continued)

*Primary Examiner* — Sharon S Lynch

(57) ABSTRACT

A first electronic network node (110) is provided configured for a key exchange (KEX) protocol, the first network node is configured to obtain a shared polynomial (a) shared with a second network node, coefficients of the shared polynomial a being selected modulo a first modulus q, generate a private key polynomial ($sk_I$), coefficients of the private key polynomial being bounded in absolute value by a bound (s) generate a public key polynomial ($pk_I$) by computing a polynomial product between the shared polynomial (a) and the private key polynomial ($sk_I$) modulo the first modulus (q) and scaling the coefficients of the polynomial product down to a second modulus (p).

20 Claims, 7 Drawing Sheets

(56) References Cited

U.S. PATENT DOCUMENTS

| | | | | |
|---|---|---|---|---|
| 9,942,039 | B1* | 4/2018 | Gutoski | G06F 7/72 |
| 9,942,040 | B1* | 4/2018 | Kalach | H04L 9/304 |
| 10,103,886 | B1* | 10/2018 | Gutoski | H04L 9/30 |
| 2018/0309574 | A1* | 10/2018 | Lyubashevsky | H04L 9/3093 |
| 2019/0349192 | A1* | 11/2019 | Tolhuizen | H04L 9/0838 |
| 2019/0386825 | A1* | 12/2019 | Bhattacharya | H04L 9/0847 |

OTHER PUBLICATIONS

Alkim et al: "Post-Quantum Key Exchange—A New Hope"; International Association for Cryptologic Research, Report vol. 20151207 2015, 33 Page Document.
Bai et al: "Lattice Decoding Attacks on Binary LWE": ACISP 2014: Information Security and Privacy, pp. 322-337.
Banerjee et al: "Pseudorandom Functions and Lattices"; Cryptology ePrint Archive, Report 2011/401, http://eprint.iacr.org/2011/401, 26 Pages. Sep. 2011.
Bogdanov et al: "On the Hardness of Learning With Rounding Over Small Modulus"; Network and Parallel Computing; Lecture Notes in Computer Science, Dec. 2015, pp. 209-224.
Bos et al: "Frodo:Take off the Ring! Practical, Quantum-Secure Key Exchange From LWE": Proceedings of the 23rd ACM Conference on Computer and Communications Security (CCS 2016), pp. 1-26.
Bos et al: "Post-Quantum Key Exchange for the TLS Protocol From the Ring Learning With Errors Problem"; International Association for Cryptologic Research, vol. 20161027:011251, Oct. 2016, pp. 1-29.
Piekert et al: "Lattice Cryptography for the Internet"; Oct. 2014, Network and Parallel Computing: Lecture Notes in Computer Science, pp. 197-210.
Cheon et al: Lizard: Cut off the Tail! Practical Post-Quantum Public-Key Encryption From LWE and LWR:International Conference on Security and Cryptography Networks, Lecture Notes in Computer Science, LNCS, vol. 11035, 2018, pp. 1-20.
PCT/EP/2018/061089, Written Opinion and ISR, dated Jul. 26, 2018, 16 Page Document.

* cited by examiner

KEY AGREEMENT DEVICES AND METHOD

CROSS-REFERENCE TO PRIOR APPLICATIONS

This application is the U.S. National Phase application under 35 U.S.C. § 371 of International Application No. PCT/EP2018/061089, filed on May 2, 2018, which claims the benefit of European Patent Application No. 17170508.0, filed on May 10, 2017. These applications are hereby incorporated by reference herein.

FIELD OF THE INVENTION

The invention relates to a network node, a key agreement method, a parameter selection device, a method of selecting parameters and a computer readable medium.

BACKGROUND OF THE INVENTION

In cryptography, a key-agreement protocol is a protocol whereby two or more parties that may not yet share a common key can agree on such a key. Preferably, both parties can influence the outcome so that neither party can force the choice of key. An attacker who eavesdrops on all communication between the two parties should learn nothing about the key. Yet, while the attacker who sees the same communication learns nothing or little, the parties themselves can derive a shared key.

Key agreement protocols are useful, e.g., to secure communication, e.g., to encrypt and/or authenticate messages between the parties.

Practical key agreements protocols were introduced in 1976 when Whitfield Diffie and Martin Hellman introduced the notion of public-key cryptography. They proposed a system for key agreement between two parties which makes use of the apparent difficulty of computing logarithms over a finite field GF(q) with q elements. Using the system, two users can agree on a symmetric key. The symmetric key may then be used for say, encrypted communication between the two parties.

Current key agreement methods applicable when the parties do not yet have a shared secret, such as the Diffie-Hellman key agreement method, require resource-heavy mathematical operations. For example, the Diffie-Hellman requires one to perform exponentiation operations over a finite field. Both the exponent and the field size may be large. This makes key agreement protocols less suitable for low-resource devices. On the other hand, key agreement protocols would be very useful in resource-restrained devices. For example, in application areas such as the internet of things, ad-hoc wireless networks, and the like, key agreement could be used to protect links between devices. Another example is communication between a reader and an electronic tag, say a card reader and a smart card, or a tag reader and tag, e.g., an RFID tag or an NFC tag. It would be advantageous to have a key agreement protocol that places a smaller burden on at least one of the two parties, i.e., on the electronic tag.

In order to facilitate secure communication among parties, key agreement protocols are sometimes further subdivided into cryptographic key-exchange (KEX) and cryptographic key-encapsulation (KEM) schemes. Cryptographic key-encapsulation (KEM) schemes use asymmetric cryptography to establish a shared secret among two parties, using a publicly known (e.g., public-key) and a secretly-owned (e.g., secret-key) value for each party.

KEX schemes involve the exchange of public-keys by each party, that is then independently used by the other party along with their own secret-key to calculate the common shared secret. A well-known example of a KEX scheme is the Diffie-Hellman key-exchange, mentioned above, whose security is based on solving the discrete logarithm problem. An interesting feature of some KEX schemes is that the actual final, shared secret is never exchanged between the parties, not even in encrypted form, but is calculated independently by the two parties at each end. This results in a desirable feature known as forward-secrecy, which ensures that even the compromise of a party's long-term secret-key by an attacker in the future would not compromise the secrecy of encrypted message exchanged in the past.

KEM schemes establish a shared secret between two entities or parties using asymmetric cryptography by one party, usually the initiator of the communication, to encrypt (using the other party's public-key) and transmit a shared secret to the other party, known as the responder, who can then decrypt it (using her secret-key) and then use it for securely communicating with the initiator party. KEM schemes cannot achieve forward-secrecy, since any attacker that compromises a party's secret-key for a past session and has recorded all messages exchanged between the parties in that session can recover the shared secret for that particular session.

Due to increasing security needs in the Internet of Things, key-exchange schemes need to also achieve high efficiency (i.e., minimal amount of communication or bandwidth requirements) while also remaining secure, against classical as well as quantum-capable adversaries.

SUMMARY OF THE INVENTION

An electronic network node configured for a key agreement protocol is provided. The network node will be referred to as the first network node to distinguish it from a second network node with which it communicates.

A first electronic network node is provided which addresses these and other concerns. The network node is configured for a key agreement protocol, which could, e.g., be a key-exchange (KEX) or a key-encapsulation (KEM) scheme. The first network node comprises a communication interface arranged for digital communication with a second network node, and a processor circuit configured to obtain a shared polynomial, the shared polynomial being shared with the second network node through the communication interface, coefficients of the shared polynomial being selected modulo a first modulus q, generate a private key polynomial, coefficients of the private key polynomial being bounded in absolute value by a bound, generate a public key polynomial by computing a polynomial product between the shared polynomial and the private key polynomial modulo the first modulus obtaining a polynomial product, scaling coefficients of the polynomial product down to a second modulus, a scaled coefficient being equal to the unscaled coefficient multiplied with the second modulus, divided by the first modulus and rounded to the nearest integer, the second modulus being smaller than the first modulus, the bound being at most the second modulus, send the public key polynomial of the first network node to the second network node, receive a public key polynomial of the second network node, compute a raw key polynomial as a polynomial product between the received public key of the second node and the private key polynomial of the first network node modulo the second modulus, and compute the shared key from the raw key.

Because the private key polynomial is bounded and the public key polynomial is scaled down, the computation and communication overhead of the key agreement is reduced. Furthermore, by using polynomials instead of, say matrices, the computation and bandwidth overhead is further reduced. Advantageously, polynomials commute further simplifying the protocol. In embodiments, the polynomials that are used are modulo an n-th degree polynomial, e.g., $X^n+1$, so that they have n coefficients. Typically, the private key polynomials have the same number of coefficients (n) as the shared polynomial, but this is not necessary. For example, the private key polynomials may have a lower degree or number of coefficients than the shared polynomial. They may even have a different number of coefficients between the first and second node. Note that even if the number of coefficients in a private key polynomial is equal to the number of coefficients of the shared polynomials, they may be sparser.

Polynomial multiplications are modulo a degree n reduction polynomial. Any reduction polynomial will work, though there can be advantages to choosing specific reduction polynomials. For example, in an embodiment, the shared polynomial is chosen such that it has no common divisor with the reduction polynomial. An advantage of this feature is that the public key polynomials will be distributed more uniformly. The reduction polynomial may also be chosen as irreducible. The latter will restrict the choice of reduction polynomials to some extent, but on the other hand has the advantage that a test on relative primality with the shared polynomial is not needed.

The moduli p and q need not be prime, and in fact are preferably a power of 2. It is furthermore, much preferred that p divides q. For example, in an embodiment, the first modulus has as bit size of 12 or more, and/or the second modulus has as bit size of 7 or more. Security is increased if the shared polynomial is not used too often. Since the shared polynomial may be public, and at least is shared, it may be known to an attacker. The attacker could use this advantage to perform precomputation on this polynomial. To avoid this avenue of attack, frequent changes of the shared key polynomial are preferred. In an embodiment, a new shared key polynomial is negotiated after a fixed number of key agreements, e.g., even each time a key agreement is performed. Also, the private key polynomial could be replaced with some frequency.

Because of the rounding down operation, an attack who observes traffic between the first node and the second node will not be able to reconstruct the private polynomials used by the nodes. On the other hand, the first nodes are capable of deriving a shared key, since they have more information than an attacker; the first and second node have their own private key polynomial in addition to the received public key polynomial.

The rounding may cause differences between the raw key computed at the first node and at the second node. Nevertheless, a shared key can be computed therefrom. There are several ways to achieve this.

In an embodiment, the first network node is further configured to receive helper data of the second network node, the helper data comprising information allowing deriving of the same shared key at the first and second node cancelling differences between the raw keys derived at the first and second nodes, and compute a shared key from the helper data and multiple coefficients of the raw key polynomial. In this case, the first network node would be responsible for generating the helper data. It is also possible the other way around, with the first network node generating the helper data, and the second network node using it. For example, in an embodiment, the first network node is further configured to obtain the shared key and the helper data from multiple coefficients of the raw key polynomial, send the helper data to the second network node.

Thus, in an embodiment, an initiating node receives from the responder node its public key and in addition helper data. Using the public key alone, the initiating node is capable of arriving at nearly the same raw key as the responding node did. However, there may be differences between the two raw keys.

Helper data provides additional information to a network node to guide it so that the network node arrives at the same shared key as the sender of the helper data did. Helper data may be some type of redundant information, and will ultimately preferably not be used in the shared key itself.

Helper data may be part of data computed from the private key, e.g., part of the raw key. Helper data may be additional data, e.g., checksum data, e.g. syndrome computed for data computed from the secret data. For example, the helper data may comprise redundancy information on the raw key, or on the shared key. Helper data may be obtained by adding one or more code words. Instead, helper data may be obtained by computing so-called syndromes of error correcting codes, e.g., for the raw key or for the shared key. In embodiments, two different types of helper data are given, reconciliation data and encapsulated keys; worked examples of these two types are given.

In embodiment, the helper data is so-called reconciliation data. For example, reconciliation data may comprise information on the raw key. For example, reconciliation data may comprise bits of the raw key derived by node. The reconciliation data allows the other node to cancel the differences between the raw keys derived by the two sides, and to compute the same shared key.

Using reconciliation data, the difference between the raw key polynomial computed at the first and second network node can be overcome. One of the nodes computes reconciliation data and the other uses it. Reconciliation data can be as little as 1 bit for each coefficient that is used to compute the shared key. Embodiment, use more, e.g., 2 or more bits.

Another option to overcome the difference between the raw keys computed at both sides is to use key encapsulation. Through the encapsulation, the shared key is protected, and moreover small differences between raw keys causes a small, correctable, difference between the de-encapsulated shared key. For example, to encapsulate a key, one may first add additional redundancy. This may, e.g., be done by mapping the bits in the shared key to numbers modulo p, e.g., by mapping a bit 0 to 0, and a bit 1 to p/2. A more extensive mapping uses an error correcting code, e.g., a repetition code. Other examples of error correcting codes include the Hadamard code, Reed-Solomon, BCH, etc. After encoding the shared key and adding the redundancy, the raw key is added mod p to the encoded share key, to obtain the encapsulated shared key. Instead of adding, also other combination functions may be used, e.g., subtraction mod p.

Helper data, e.g., reconciliation data, error correction data, etc., need not be generated or used for all coefficients of the raw key. Not all coefficients of the raw key need to be used to compute the shared key, only those coefficients that are actually used need to be taken into account for the helper data. For example, in an embodiment, the shared key is derived from a fixed number and/or predetermined coefficients of the raw key. Reconciliation data is then obtained, sent, received, and/or applied only for those coefficients, and for fewer than all coefficients of the raw key polynomial. In an embodiment, the coefficients that are used for the shared key may vary. For example, one of the first and second node, say the initiating node, sends a seed to the other node. Both nodes use the seed to randomly decide which coefficients to take into account for helper data and for the shared key.

Note that for both types of helper data, a network node, e.g., a responder node, is configured to obtain the shared key and obtain the helper data from at least multiple coefficients of the raw key polynomial. In the case of reconciliation data, both the shared key and the helper data can be obtained from multiple coefficients of the raw key. In the case of encapsulation, the helper data is obtained from the multiple coefficients of the raw key and the shared key. Multiple coefficients may be all coefficients.

An advantage of key agreement methods according to embodiments is that they have smaller bandwidth requirements due to scaling, and have lower computational requirements due to the bound on the coefficients in the private key polynomials. For example, in an embodiment, the bound in absolute value on coefficients of the private key polynomial is 2, or the bound is 1, the latter corresponding to signed binary. Preferred embodiments use a bound of 1, wherein the coefficients are either binary (0 or 1) or signed binary (0, −1, or 1); the latter being most preferred.

Interestingly, overhead can be further reduced by limiting the number of non-zero coefficients, even if the number of coefficients themselves is much larger. For example, in an embodiment, the device may be configured with a predetermined number of non-zero coefficients. This number can be enforced in different ways. For example, in an embodiment, a private key polynomial is generated with at most the number of non-zero coefficients (referred to as the hamming weight of a polynomial). It is beneficial, though not necessary, if the private key polynomial is as random as possible given the conditions imposed upon it. For example, with a given hamming weight and bound on the size of the coefficients, a private key polynomial may be chosen uniformly random from the candidate private key polynomials, e.g., from all private key polynomials that satisfy the bounds.

Another way to enforce the hamming weight is by choosing the private key polynomial from a probability distribution. The probability distribution having a fixed expected number of non-zero coefficients for the private key polynomial. In this case, it can happen that sometimes a private key polynomial will have a little higher or a little lower hamming weight. For example, in an embodiment, coefficients of the private key polynomial may be chosen from a non-uniform probability distribution, wherein the probability of a zero coefficient is larger than the probability of a non-zero coefficient.

The exact size of the hamming weight does not appear to be critical. Especially, in production sized examples, where the number of coefficients is larger, a good choice appears to be about the number of coefficients divided by 5 (0.2n). However, it is possible estimate a minimal hamming weight by minimizing $h_s$ (the hamming weight) under the condition that $$\log_2\binom{n}{h_s} + h_s$$

is at least, say, 127, or more preferably at least 255.

Aspects of the invention include a device and method to search for good parameter sets.

The network nodes are electronic devices. For example, they may be mobile electronic devices, such as a mobile phone, tablet, or a smart-card, computer. The network node may be a set-top box, computer, television, and the like. The method of key agreement described herein may be applied in a wide range of practical applications. Such practical applications include security in the Internet (of Things). Protocols can be applied to protocols such as IKE, TLS, SSH, and others. In general, the proposed scheme is post-quantum secure both for general Internet use-cases and for resource-constrained environments. Key agreement may be used whenever secured, e.g. confidential, communication between two nodes is required. This may be in a sensor network, but also e.g., to secure financial transactions.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of an embodiment of a key agreement network, FIG. 2 schematically shows an example of an embodiment of a raw key, FIG. 3 schematically shows an example of an embodiment of an electronic key exchange method, FIG. 4a schematically shows a computer readable medium having a writable part comprising a computer program according to an embodiment, FIG. 4b schematically shows a representation of a processor system according to an embodiment.

Figure 1:
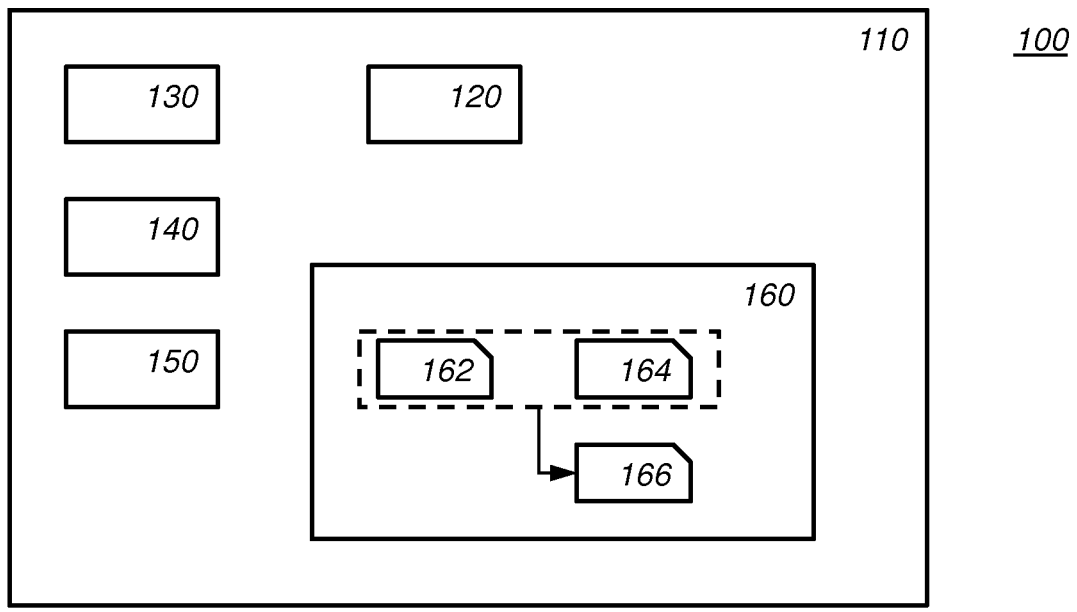
Figure 1:
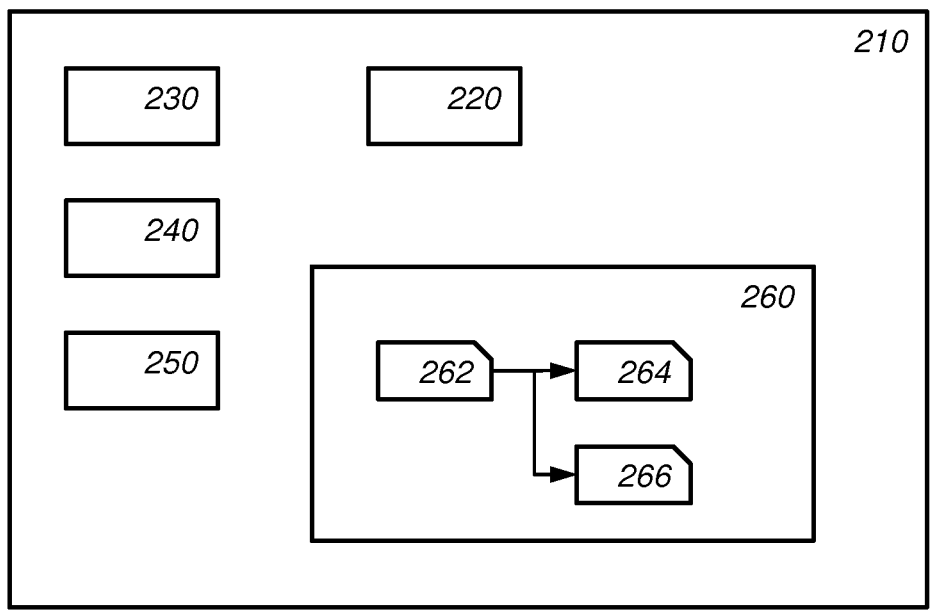

LIST OF REFERENCE NUMERALS IN FIGS. 1-2, 5, 6a 100 a key agreement network
110 a network node of initiator type
120 a communication interface
130 a shared polynomial unit
140 a private key polynomial unit
150 a public key polynomial unit
160 a shared key unit
162 a raw key
164 reconciliation data (h)
166 a shared key
210 a network node of responder type
220 a communication interface
230 a shared polynomial unit
240 a private key polynomial unit
250 a public key polynomial unit
260 a shared key unit
262 a raw key
264 reconciliation data (h)
266 a shared key
300 a coefficient of a raw key polynomial
301 a most significant part
302 a middle significant part
303 a least significant part
500 a key agreement network
510 a network node of initiator type
520 a network node of responder type
560 a shared key unit
564 an encoded key
570 a shared key unit
573 a generated shared key
574 an encoded shared key
576 an encapsulated shared key
600 a parameter selecting device
602 an output interface
610 parameter set generator
620 p, q selection unit
630 n, m optimizer
640 optimizer

DETAILED DESCRIPTION OF THE EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

FIG. 1 schematically shows an example of an embodiment of a key agreement network 100.

Shown in FIG. 1 are two network nodes in the system: a network node 110 of initiator type and a network node 210 of responder type. In an embodiment of the key agreement system the number of nodes may be larger, even much larger, than two, e.g., more than a 1000 nodes, e.g. more than $10^6$ nodes.

The difference between a network node of initiator or responder type is how it deals with reconciliation data. A network node of initiator type receives reconciliation data and applies it to obtain the shared key, whereas a network node of responder type generates reconciliation data and sends it the network node of initiator type. The responder type network node does not need reconciliation data to obtain the shared key. Typically, an initiator type will also initiate the key agreement protocol between the two network nodes, as this may reduce the number of rounds executed between the two networks node. However, it is not necessary; the key agreement protocol could also be initiated by a network node of responder type.

Furthermore, in an embodiment of the network node, the network node is configured to operate according to an initiator mode and according to a responder mode. For example, if the network node initiates a key agreement, e.g., sends a message to another network node signaling the start of the key agreement protocol, then the network node may switch to initiator mode. If the network node responds to a key agreement, e.g., receives a message from another network node signaling the start of the key agreement protocol, then the network node may switch to responder mode. Although this is convenient in practice, also this option is not strictly necessary; for example, in a key agreement system some modes may only be configured as initiator and some may only be configured as responder nodes. A consequence of this will be that some nodes cannot agree on a shared key together. For some networks this need not be a problem, e.g., in ad-hoc network, or ad-hoc wireless grids, etc., so long as sufficiently many pairs of network nodes can communicate and agree on a shared key.

Initiator node 110 comprises a communication interface 120. Responder node 210 comprises a communication interface 220. The communication interfaces may be arranged for digital communication with the other nodes in the key agreement system. It is not necessary though that all nodes in the system can be reached at all times.

Communication interface 120 and 220 are arranged for digital communication. For example, the communication interfaces may be arranged to communicate over a computer network. For example, the communication interface may be arranged for wireless, e.g., Wi-Fi, ZigBee, Bluetooth and the like, and/or wired communication, e.g., Ethernet, USB, and the like. The communication between nodes 110 and 210 may also be a combination of wired and wireless connections. For example, the nodes in system 100, including nodes 110 and 120 may comprise an electronic storage that contains a communication identifier, which uniquely identifies the node within system 100. For example, the communication identifier may be included in digital messages exchanged between nodes 110 and 210, e.g., to address the message. For example, the communication identifier may an IP address, a MAC address, and the like.

In an embodiment, the electronic network node is configured for a key exchange (KEX) protocol. The protocol involves exchanging messages between the nodes 110 and 210 over the communication interfaces 120 and 220, and performing computations on, e.g., data received from the other node. The execution of the key agreement protocol is implemented in a processor circuit, examples of which are shown below. FIG. 1 shows functional units that may be functional units of the processor circuit. For example, FIG. 1 may be used as a blueprint of a possible functional organization of the processor circuit. The processor circuit is not shown separate from the units in FIG. 1. For example, the functional units shown in FIG. 1 may also be wholly or partially be implemented in computer instructions that are stored at the network nodes and are executable by a microprocessor of the network node.

In the embodiments related to FIG. 1, Initiator node 110 and responder node 210 are configured for a key exchange (KEX) protocol. KEX schemes involve the exchange of public-data, often termed public keys, by each party, that is then independently used by the other party along with their private data, often termed a secret-key, to calculate the common shared secret. An interesting feature of some embodiments is that the actual final, shared secret is never exchanged between the parties, not even in encrypted form, but is calculated independently by the two parties at each end. This results in a desirable feature known as forward-secrecy, which ensures that even the compromise of a party's long-term secret-keys by an attacker in the future would not compromise the secrecy of encrypted message exchanged in the past.

Embodiments of the inventions do not rely on a trusted third party to provide confidential communication. The communication channel between communication interfaces 120 and 220 need not necessarily be a secure channel. Attackers may be able to eavesdrop on the communication channel. Even so, the key that is agreed between nodes 110 and 210 may be secure. If the communication channel is protected against alterations, a degree of authentication may be obtained in so far as provided by the channel. However, if the channel between communication interfaces 120 and 220 is not protected against alterations, no KEX scheme will achieve authentication. To obtain authentication, embodiments may be combined with any known authentication mechanism, e.g., an implicit authentication mechanism, e.g., using certified public-keys, or an explicit authentication mechanism, e.g., using digital signatures.

A well-known example of a KEX scheme is the Diffie-Hellman key-exchange, whose security is based on solving the discrete logarithm problem. In the invention, a key-exchange mechanism is defined whose hardness is based on a so-called Learning with Rounding (LWR) problem. The hardness of the LWR problem may be based on the hardness assumption of the so-called Learning with Error (LWE) problem when the number of LWE instances is bounded. Since the average-case hardness of the LWE problem is based on the worst-case hardness of certain related lattice-based problems, which are difficult for a quantum computer to solve, this key-exchange scheme is a post-quantum secure key agreement protocol. As embodiment use the LWR problem in a ring, we will also refer to this problem as the ring-LWR problem.

The Learning with Errors (LWE) problem is a mathematically hard problem, giving rise to post-quantum cryptographic schemes due to its presumed difficulty even against quantum computers, and well-understood security. However, schemes arising from it are typically heavyweight in performance, both with respect to computational and communication complexities. The Learning with Errors (LWE) problem can be described as follows:

For an n-dimensional vector $s \in Z_q^n$ and an error distribution $\chi$ over $Z_q$, the LWE distribution $A_{n,q,\chi}^{LWE}(s)$ over $Z_q^n \times Z_q$ is obtained by choosing a vector a uniformly and randomly from $Z_q^n$ and an error e from $\chi$, and outputting $(a, b=\langle a,s \rangle + e) \in Z_q^n \times Z_q$.

The search LWE problem is to find $s \in Z_q^n$ given arbitrarily many independent samples $(a_i, b_i)$ from $A_{n,q,\chi}^{LWE}(s)$. The decision LWE problem, denoted by $LWE_{n,q,\chi}(D)$ is to distinguish the distribution $A_{n,q,\chi}^{LWE}(s)$ from the uniform distribution over $Z_q^n \times Z_q$ with non-negligible advantage, for a fixed $s \leftarrow D$.

The LWR problem is a "de-randomized" version of the LWE problem, by using rounding with a modulus "p" instead of inserting errors to hide secret information, and then introducing a deterministic error by scaling down from $Z_q$ (where q is the original LWE modulus) to $Z_p$.

For an n-dimensional vector $s \in Z_q^n$, the LWR distribution $A_{n,q,p}^{LWE}(s)$ over $Z_q^n \times Z_p$ is obtained by choosing a vector a uniformly and randomly from $Z_q^n$, and outputting $$\left(a, \left\lfloor \frac{p}{q} \cdot \langle a,s \rangle_q \right\rceil \right) \in Z_q^n \times Z_p.$$

Here, $\lfloor x \rceil$ denotes the integer closest to x. The search LWR problem is defined in terms of finding the secret s exactly similar to the search LWE problem. The decision LWR problem is to distinguish the distribution $A_{n,q,p}^{LWE}(s)$ from the uniform distribution over $Z_q^n \times z_p$ with m instances for a fixed $s \leftarrow D$. It has been shown that the search and decision LWR problems are at least as hard as the corresponding LWE problems when m is bounded such that 2 mBp/q is a constant (where B is a bound on the errors in the LWE problem).

Post-quantum key-exchange schemes based on the LWE problem enjoy widespread confidence due to the well-understood security of the LWE problem. However, there is no LWE-based key-exchange scheme that is lightweight in performance, capable of being used in resource-constrained environments. Existing algorithms include various operations that are slow on limited-resource devices, such as: matrix multiplication modulo q, sampling from a probability distribution such as a Gaussian distribution, and computation or transmission of matrices with large entries.

In the invention, the two parties generate two polynomials that are approximately, but not exactly equal. To come to exact agreement, some reconciliation data is sent. A scheme for doing so is explained in a patent application of the same applicant, with title "REACHING AGREEMENT ON A SECRET VALUE", filed at the EPO on 4 Nov. 2016, with application Ser. No. 16/197,277.3; for example, the method on pages 7-10 may be used for reconciliation in embodiments according to the invention. Variants disclosed elsewhere in the cited patent application may also be adopted.

In this application, we will use the following notation for the following three functions:

1. Rounding Function $\lfloor \cdot \rceil_{B,b_h}$: For q, $b_h, B \in Z$, $b_h \geq 1$, $B < \log_2 q - b_h$, let
   $\bar{B} = \log_2 q - B$. Then, $\lfloor \cdot \rceil_{B,b_h}: v \mapsto \lfloor 2^{-\bar{B}} \cdot v \rceil \pmod{2^B}$ Intuitively, $\lfloor v \rceil_{B,b_h}$ extracts the B most significant bits of $\{v+2^{\log q-(B+b_h)}\}$, where the second component is a rounding factor to ensure unbiased rounding errors.

2. Cross-Rounding Function $\langle . \rangle_{B,b_h}$: For $q, b_h, B \in \mathbb{Z}$, $b_h \geq 1$, $B < \log_2 q - b_h$, let $\overline{B} = \log_2 q - B$. Then, $$\langle . \rangle_{B,b_h}: v \to \lfloor 2^{-\overline{B}+b_h} v \rfloor (\bmod\ 2^{b_h})$$

Intuitively, $\lfloor v \rfloor_{B,b_h}$ extracts the $b_h$ least significant bits of the $(B+b_h)$ most significant bits of v.

3. Reconciliation Function rec(w,b): For q, $b_h$, $B \in \mathbb{Z}$, $b_h \geq 1$, $B < \log_2 q - b_h$, $w \in \mathbb{Z}_q$, $b \in [0, 2^{b_h})$, $$\mathrm{rec}(w,b) = \lfloor v \rceil_{B,b_h}$$

where v is the closest element to w such that $\langle v \rangle_{B,b_h} = b$.

These three functions can be applied to coefficient-wise to polynomials.

Figure 2:
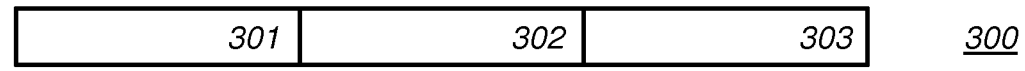

The above cited reconciliation function is used as an example, herein. As noted, the reconciliation methods in the above cited application could also be used. FIG. 2 is a schematic illustration of the rounding and cross rounding functions. As an example, FIG. 2 shows a coefficient of a raw key polynomial 300. Coefficient 300 is illustrated as a bit string, with the most significant bits to the left and the least significant bits to the right. Intuitively, the rounding function applied to the coefficient corresponds to the B bits in most significant part 301, the cross-rounding function to the $b_h$ next bits in middle part 302. The least significant $\log_2 q - B - b_h$ may be discarded.

Initiator node 110 comprises a shared polynomial unit 130. Responder node 210 comprises a shared polynomial unit 230. The shared polynomial units 130 and 230 are configured to obtain a shared polynomial (a) that is shared between the two nodes. Coefficients of the shared polynomial a are integer numbers selected modulo a first modulus q. There many ways to ensure that the same polynomial is shared between nodes 110 and 210, especially given the fact that the polynomial a does not necessarily be kept private to the nodes 110 and 210.

For example, one of the nodes, say the initiator node 110, e.g., in shared polynomial unit 130, may select a polynomial a, e.g., at random with elements modulo q. The coefficients may then be sent through the communication units to the other node, e.g., to shared polynomial unit 230. In this case, the latter shared polynomial unit 230 will simply receive the polynomial and store it. Polynomial a may also be chosen by responder node 210 instead and sent to the initiator node 110.

The two nodes may also cooperate in choosing the polynomial a. For example, each node may select some of the coefficients, and sent it to the other side. For example, the initiator nodes may select the odd degree coefficients, and the responder node the even degree coefficients, etc. In this way, none of the two nodes has control over the final polynomial a. For example, the two nodes could each select a full polynomial a and communicate it to the other side. After this, the two polynomials may be added modulo q. To avoid giving the last node to send the polynomial an advantage, a commitment on the chosen polynomial may first be sent by said last node.

An interesting way to reduce the overhead of sending the full polynomial a is to generate a random seed and sending the random seed through the communication channel to the other node. After receiving the seed, the first and second network node may use it to generate the polynomial a in any of the above ways. The same random seed is used to seed a deterministic pseudo random number generator which in turn generates the polynomial (a) from the output of the pseudo random number generator. As above, each node can send a seed, e.g., to generate different parts of a, or the two seeds may be combined, e.g., added, or XOR-ed etc., and the combined seed may be used to generate a.

The seeds may, e.g., be selected from a further random number generator, e.g., a true random number generator. The nodes may also be configured with a list of random numbers, e.g., at manufacture. In this case, the nodes select a next random number from the list each time a new polynomial a is generated for a new key agreement. If the list of random numbers is exhausted, it may be replenished from a trusted source.

If it is desired that the shared polynomial is relatively prime with a reduction polynomial, which itself is not irreducible, then one could generate a relatively prime shared polynomial from the seed. For example, first a random polynomial may be generated from the seed, and next the first polynomial in some ordering after the generated polynomial that is relatively prime to the reduction polynomial is selected. Alternatively, it is checked if a generated polynomial is relatively prime with the reduction polynomial. If not, a new seed is generated, until a shred polynomial is generated that is relatively prime with the reduction polynomial.

In an embodiment, a first network node is arranged to obtain a shared polynomial (a) by generating a random seed and sending the random seed through the communication channel to the other node, the first and second network node using the random seed to seed a deterministic pseudo random number generator, generating the polynomial (a) from output of the pseudo random number generator.

Initiator node 110 comprises a private key polynomial unit 140. Responder node 210 comprises a private key polynomial unit 240. Private key polynomial unit 140 is configured to generate a private key polynomial $sk_I$; Private key polynomial unit 240 is configured to generate a private key polynomial $sk_R$. The coefficients of the private key polynomials are integer numbers bounded in absolute value by a bound s. For example, a coefficient in a private key polynomial may be chosen between −s and s (bounds included).

The inventors found that, surprisingly, choosing the bound small has a dual advantage: polynomial multiplications with the private key polynomials are faster, and the distance between the raw keys computed at each side is smaller (see below). The latter means that less reconciliation data is needed and/or the chance of a failure in the protocol because the nodes agreed on a different key is smaller. The bound s is chosen at most the second modulus, e.g., less-than-or-equal to the second modulus. This choice is advantageous since later we multiply modulo p. We can restrict it to at most (or smaller than) half the second modulus (p/2) if we allow for signed coefficients of the private key polynomials. The bound may be lower than the second modulus or half the second modulus, and in practice the bound will typically be chosen much smaller than that. In an embodiment, the bound s on the absolute value of coefficients of the private key polynomial ($sk_I, sk_R$) is 2 (s=2). That is, all coefficients of a private key polynomial are either −2, −1, 0, 1, or 2. To multiply polynomial a with a private key polynomial only additions, subtractions and shifts over 1 bit are needed. Such a polynomial multiplication can thus be implemented very efficiently.

From an implementation perspective, best results are achieved by choosing the bound to be 1 (s=1). That is, the coefficients of a private key polynomial are only the values −1, 0 and 1. We will refer to this also as 'signed binary'. Polynomial multiplication with a polynomial in signed binary only involves additions and subtractions. No multiplication unit for multiplication modulo p or q is needed. The bound s=1 may be even further restricted by using only binary coefficients, e.g., 0 or 1; however, in embodiments at least some of the coefficients are 1, −1 and 0.

Other small numbers for s are also possible, e.g., if s=3, the allowed coefficients are: 0, 1, −1,2, −2,3, −3. Multiplication routines for multiplying with these numbers may be comprised in the nodes. For example, +1, −1 may be handled by an adder/subtractor, −2, +2 may be handled by a shift followed by an adder/subtractor, and +3, −3 may be handled by adding/subtracting both the shifted and non-shifted number.

In an embodiment, the private key polynomial comprises only coefficients that are 0, powers of two and optionally minus powers of two as these are easy to multiply with.

In an embodiment, the private key polynomial contains both positive and negative numbers. However, it is also possible to further restrict the private key polynomial to non-negative numbers. For example, the coefficients of the private key polynomial may be between 0 and s (bounds included). For example, by choosing s=1, in the latter case avoids both multiplication and subtraction operations.

We will refer to the number of coefficients of polynomials instead of to their degree, to avoid complications in case the highest degree coefficient is 0. We will refer with n to the number of coefficients of shared polynomial a. Typically, the private key polynomial and the shared polynomial will have the same number of coefficients, but this is not necessary. In an embodiment, the private key polynomials also have n coefficients. All polynomial multiplications are modulo a degree n polynomial. Practically speaking the polynomial may be $x^n+1$, though other polynomials would also work. Note that the set of polynomials $\mathbb{Z}_q[x]/(x^n+1)$ forms a ring. This ring will typically not be field: Both q and $x^n+1$ may be composite, and typically will be. Note that the rounding operations, which we discuss below maps this rings to a smaller ring, in a manner incompatible with the ring multiplication. This intentional breaking of mathematical structure complicates analysis, and increases security. The number of coefficients n is chosen large enough to obtain a sufficient number of bits in the shared key, and to obtain a sufficiently high security level.

In addition to restricting the size of the coefficients of the private key polynomial further advantages are obtained by restricting the number of non-zero elements. We will refer to the hamming weight $h_s$ of polynomial as its number of non-zero coefficients The inventors investigated different ways to restrict the hamming weight of private key polynomials.

For example, an upper bound may be selected for the hamming weight of a private key polynomial. In an embodiment, the private key polynomials of the initiator and of the responder ($sk_I$,$sk_R$, respectively) have the same fixed hamming weight.

Security is improved if—subject to the conditions—a private key polynomial is chosen uniformly random from the candidate private key polynomials, that is from the polynomials that satisfy the chosen requirements, e.g., as to the bounds on coefficients (s) and the hamming weight. For example, if one desires to enforce the condition that the hamming weight is 50, then it is advantageous to select a private key polynomial from the set of all polynomials with the correct number of coefficients that have hamming weight of 50. Efficient algorithms to select a uniformly random bit string of any desired hamming weight are known.

A different way to restrict the hamming weight of the private key polynomials is to choose coefficients of a private key polynomial ($sk_I$,$sk_R$) from a probability distribution. For example, coefficients of the private key polynomial ($sk_I$,$sk_R$) may be chosen from a non-uniform probability distribution, wherein the probability of a zero coefficient is larger than the probability of a non-zero coefficient. In an embodiment, the probability distribution is chosen so that it gives a predetermined expected hamming weight. For example, to choose a polynomial with n coefficients and expected hamming weight $h_s$, one may select each coefficient as non-zero with probability $h_s$ in. The non-zero coefficient may be chosen as 1 or −1, e.g., with equal probability.

A hamming weight in the polynomials that is too small may impact the security. For example, for the signed binary case, one may choose the hamming weight $h_s$ such that $$\log_2\binom{n}{h_s}+h_s$$

is at least 127, more preferably at least 255. The reason is to make brute-force attack by looping over private key polynomials infeasible. In an embodiment, the hamming weight $h_s$ is as small as possible to satisfy the above bound. In practical embodiments, for larger n, one may simply select the hamming weight proportional to the number of coefficients, e.g., one may set $h_s=\alpha n$, e.g., with $\alpha=0.2$. More generally, one may, e.g., pick $0.1<\alpha<0.9$.

Initiator node 110 comprises a public key polynomial unit 150. Responder node 210 comprises a public key polynomial 250. The public key polynomial unit computes a public key polynomial from polynomial a and a private key polynomial sk.

The terms public and private are intended to convey that the shared key cannot be obtained only with knowledge of public information, or not without knowledge of some private information. There is no requirement though that public information is actively shared. For example, the key agreement protocol could be executed over a (presumed) secure channel, which keeps the public keys secure from eavesdroppers. In this case, the key agreement protocol provides an additional layer of security in case the security of the channel is breached.

The public key polynomial unit computes a public key polynomial ($pk_I$, $pk_R$ for the initiator and the responder respectively) by computing a polynomial product between the shared polynomial (a) and the private key polynomial ($sk_I$, or $sk_R$ respectively) modulo the first modulus (q) obtaining a polynomial product, reducing the polynomial modulo a reduction polynomial, and scaling the result down.

However, this intermediate polynomial multiplication is not revealed. Knowledge of the shared polynomial a and the result of this polynomial multiplication before scaling down would reveal the private key, as it may be computed by dividing out the polynomial a. The scaling step performed by the public key polynomial unit blocks this option. The public key polynomial unit scales the coefficients of the polynomial product down to a second modulus p. The second modulus p is smaller than the first modulus q. A scaled coefficient is equal to the unscaled coefficient multiplied with the second modulus (p), divided by the first modulus (q) and rounded to the nearest integer. For example, if x is an unscaled coefficient modulo q in the polynomial product, the scaled coefficient may be selected as $$\lfloor \frac{p}{q} x \rceil,$$

wherein $\lfloor\ \rceil$ represents the nearest integer. After the scaling operation, it is no longer straightforwardly possible to compute the private key from the public key and the polynomial a.

Coefficients of a public key polynomial may be represented as integers in the interval [0,p−1]. Coefficients of a private key polynomial may also be represented as integers in the interval [0,p−1]. There is an advantage to choose the coefficients in the interval $$[-\frac{p}{2}, \frac{p}{2}]$$

to reduce me size of me integers for subsequent multiplications. As pointed out above the private key polynomial may also have coefficients chosen in the interval [−s,s] or even [0,s].

The multiplication of polynomial a and a private key polynomial s is done modulo the first modulus q. For this end the network node may comprises a modular reduction unit for reducing modulo q. If the coefficients of the private key polynomial s are small, e.g., bounded by 1, or bound by 1 in absolute value, the modular reduction may be simplified; during the polynomial multiplication, each time a coefficient becomes larger than a or smaller than 0 the result is brought back to the interval 0 to q−1 by subtracting or adding a.

Both the initiator node and the responder node send their public key polynomial to the other node, e.g., using the communication interfaces 120 and 220. The inventors found at least three advantages that are realized by scaling down the polynomial product. First of all, generation and explicit addition of noise into the polynomial product is avoided. Introducing noise requires the computation of a probability distribution, e.g., a Gaussian distribution. This is relatively computationally intensive. Second, communication requirements are reduced. Since second modulus p is smaller than the first modulus q, fewer bits are needed to represent a coefficient of the public key polynomial than of a private key polynomial. Third, computations that involve the public key polynomial are smaller since they involve smaller numbers. It is surprising that a single measure simultaneously provides three advantages.

It is strongly preferred that the second modulus p divides the first modulus q. Interestingly, the inventors found that neither the first nor the second modulus needs to be a prime number. In fact, it was found that choosing the second modulus (p) and/or the first modulus (q) as a power of 2 has the advantage that the public and private keys are uniformly distributed. In an embodiment both the first and second modulus is a power of 2. In an embodiment, we further require that $2^{B+b_h}$ divides p in addition to moduli p and q that are powers of two. This causes uniform shared keys even if the reconciliation data is observed. B is the number of shared key bits extracted per coefficient of raw key. In some embodiments, not all coefficients of the raw key are used, in that case B is the number of shared key bits extracted per used coefficient.

The sizes of the moduli need not be very large. For example, in an embodiment the second modulus has as bit size of 12 or more, and/or the first modulus has as bit size of 8 or more. Larger or smaller sizes are possible depending on the security requirements. In an embodiment, q is in the range of $2^{12}$ and $2^{16}$ p is in the range $2^7$ and $2^9$ (inclusive). The values of p and q may be chosen larger or smaller as security demands dictate.

Initiator node 110 comprises a shared key unit 160. Responder node 210 comprises a shared key unit 260. The shared key units are different in the sense that they either generate and transmit, or receive and apply the reconciliation data.

Both shared key unit 160 and shared key unit 260 are configured to compute a raw key 162, 262 as a polynomial product modulo the second modulus (p) between the received public key of the other node and the private key polynomial of the network node itself, followed by reduction modulo the reduction polynomial. Note that if the scaling operation were omitted both parties would compute an identical raw key. That is, identical keys would result without scaling and all computations were done modulo q. However, due to the scaling both raw keys need not be identical. Computing the raw key is done modulo p. The network nodes may comprise a modular unit for reducing the result of the multiplications modulo p.

Shared key unit 260 of responder node 210 is arranged to obtain the shared key 266 and reconciliation data 264 from the raw key 262, and to send the reconciliation data 264 to the initiator network node 110. Reconciliation data may take the form of one or more bits in the raw key. Bits chosen as reconciliation data are ignored for the purpose of generating a key.

Shared key unit 260 chooses some bits from the coefficients of the raw key to form a key from. For example, the chosen bits may be concatenated. In an embodiment, the chosen bits are input to a key derivation function (KDF), e.g., a cryptographic hash function. An example of a KDF is given in e.g., the CMLA KDF from CMLA Technical Specification, Version: V1.43-20131218, or the KDF function defined in "DRM specification", OMA-TS-DRM-DRM-V2_0_2-20080723-A, Open Mobile Alliance™ Version 2.0.2, section 7.1.2, etc. The key derivation function may be applied to the coefficients of key bits in the raw key, e.g. obtained by the rounding function, e.g., after concatenation, or from the outputs from the reconciliation function, e.g., also after concatenation.

Some bits that are not chosen as key bits may be selected as reconciliation data. Finally, some bits may be discarded altogether. In an embodiment, key bits are selected from the MSB parts of the raw key coefficients, reconciliation data is selected from middle parts of the raw key coefficients, least significant parts of the raw key may be discarded. For example, the key bits may be obtained by applying the rounding function to the coefficients of the raw key; the reconciliation bits may be obtained by applying the cross-rounding function to the coefficients of the raw key.

The key reconciliation data obtained from the raw key by shared key unit 260 is sent to the initiator node 110.

Shared key unit 160 is configured to receive the reconciliation data 164 (*h*) of the second network node, and to compute a shared key by applying a reconciliation function to the received reconciliation data and the raw key polynomial 162. For example, the reconciliation function may be applied to each of the coefficients of the raw key 162 and corresponding part of reconciliation data. For example, if the reconciliation data 164 was part of the raw key generated by responder unit 210, the initiator node may select a raw key that could have been obtained by node 210 and is compatible with the received reconciliation data, e.g. has the same middle bits as received. One way of doing this is to use the reconciliation function defined above. As a result, the same bits are recovered that node 210 used to create the shared key. By concatenating the bits in the same way, or by inputting them to the same KDF the same shared key 166 is obtained. In an embodiment, the shared key is a symmetric key.

Not much reconciliation data is needed, only a single bit can be sufficient. However, it was observed that increasing the number of reconciliation bits to 2 bits or more is advantageous, since it reduces the failure probability of the protocol.

Typical values for B and $b_h$ are 1 or 2. Herein is B the number of key bits extracted per raw key coefficient, and $b_h$ the number of reconciliation bits per raw key coefficient. The number of coefficients (n) is chosen such that the product of n and B is larger than or equal to a desired key size, for example, $nB \geq 256$.

One could reuse one of the polynomial a and the private key polynomial for multiple executions of the key agreement protocol (if both are the same one would obtain the same shared key). This would reduce communication overhead, especially if polynomial a is reused. However, the inventors realized that there is no need to reuse any of polynomial a and private key polynomial since no authentication is connected to these elements. In a preferred embodiment, a fresh polynomial a and a fresh private key is obtained for each new key exchange. This has the advantage that attackers do not have the option to observer additional information by observing multiple executions of the protocol. Moreover, forward secrecy is improved.

After the protocol is completed and both nodes have computed a shared key, one of the nodes may send a key confirmation message to the other node to verify that they have agreed on the same key. For example, a key confirmation message may be a hash of the shared key, an encryption of a fixed value, an encryption of a random value together with the random value. Key confirmation may also be performed using a challenge response protocol. One may also choose to omit key confirmation. If the parties obtain a different shared key, then subsequent communication performed between them will fail. For example, the shared key may be used to encrypt and/or authenticate further communications, e.g., digital messages. If they arrived at a different shared key, then decryption and/or verification may fail.

Below further specific advantageous embodiments are described. The basic system representing this invention is a protocol, henceforth named the key-exchange (KEX) scheme, that can be carried out by two entities or parties, henceforth named Initiator and Responder in order to establish a shared secret between themselves that is known only to them. For this purpose, they use a number of common system parameters that they must agree on prior to carrying out the KEX scheme, some private information possessed by each of them, henceforth named their secret-keys and some public information possessed by each of them, henceforth named their public-keys. The security of the KEX scheme is based on the Learning with Rounding (LWR) problem whose security is based on the Learning with Errors (LWE) problem, protecting the secrecy of the shared secret and the secrecy of the Initiator's and Responder's secret-keys.

In the examples below, the private key polynomials are signed binary.

An embodiment of the KEX scheme comprises three phases: Set-up, Key-generation and Key-Exchange. In an embodiment, the phases of this embodiment of our key-exchange scheme are as follows:

Setup: Initiator and Responder agree on the following positive integers:
  i. q,p: Such that p/q.
  ii. n and $\Phi(X) = X^n + 1$. All polynomial multiplications are modulo this reduction polynomial
  iii. $h_s < n$. This is the hamming weight of private key polynomials
  iv. B: Number of bits extracted per coefficient of the two parties' raw keys, while creating the final shared secret or key.
  v. $b_h$: Number of bits extracted per coefficient of the two parties' raw keys, while creating the reconciliation data.
  vi. $a \leftarrow R_q$: A random polynomial, where $R_q = Z_q[X]/(\Phi(X))$ is the residue ring of a cyclotomic ring modulo an integer g. Preferably, a and $\Phi$ are relatively prime.

Key-generation: Both initiator and responder generate their secret-public key-pairs as follows:
  i. Secret-key: A secret polynomial $sk \leftarrow HWT_n(h_s)$, e.g., a random polynomial with n coefficients and hamming weight $h_s$
  ii. Public-key:

$$pk = \left\lfloor \left(\frac{p}{q}\right) \cdot \{a \cdot sk (\bmod q)\} \right\rfloor$$

The selection of the common parameters can be integrated into a protocol such as TLS or IKE if the specific parameters are mapped to a given identifier. For example, a protocol identifier, e.g., in TLS the cipher suite element, may be used to encode the common parameters. The public polynomial can also be derived from a seed, e.g., by means of a hash function. In a different solution, the initiator will decide some parameters that will be sent to the responder.

Key-exchange: This proposed key-exchange scheme—key-exchange between an initiator I and responder R uses rounding and sparse, secret polynomials containing ternary entries, leading to the establishment of a shared secret K between I and R.

| KEX Initiator | KEX Responder |
| --- | --- |
| Agrees upon a fresh $a \leftarrow R_q$ with peer, chooses a fresh, secret $sk_I \leftarrow HWT_n(h_s)$, $p \in Z$ such that $p < q$ and $p\|q$. | Agrees upon a fresh $a \leftarrow R_q$ with peer, chooses a fresh, secret $sk_R \leftarrow HWT_n(h_s)$, $p \in Z$ such that $p < q$ and $p\|q$. |
| $pk_I = \left\lfloor \left(\frac{p}{q}\right) \cdot \{a \cdot sk_I (\bmod q)\} \right\rfloor.$ | $pk_R = \left\lfloor \left(\frac{p}{q}\right) \cdot \{sk_R \cdot a (\bmod q)\} \right\rfloor.$ |

| KEX Initiator | KEX Responder |
|---|---|
| | |

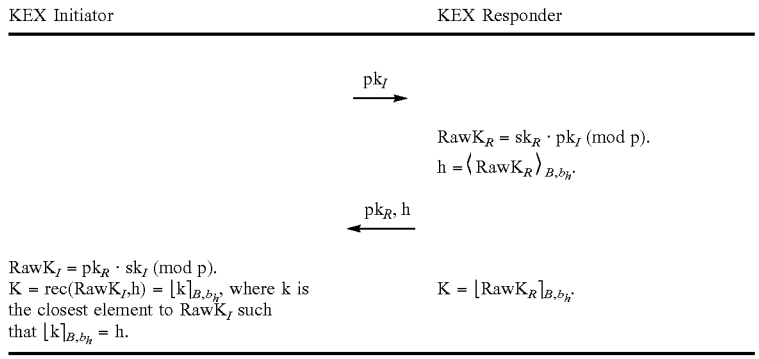

$RawK_I = pk_R \cdot sk_I \pmod p$.
$K = rec(RawK_I, h) = \lfloor k \rceil_{B,b_h}$, where k is the closest element to $RawK_I$ such that $\lfloor k \rceil_{B,b_h} = h$.

$K = \lfloor RawK_R \rceil_{B,b_h}$.

For implementation purposes, the parameter n should be advantageously a power of 2, however this is not a design requirement.

Selecting the hamming weight is not critical, but assuming a targeted security-level in bits of s (post-quantum) and 2S (classical). In order to ensure that an exhaustive, brute-force search of the secret-key in order to estimate its coefficients has a high enough workload, the number of secrets in the secret-key vectors (each having a hamming weight $h_s$) should satisfy:

$$\binom{n}{h_s} \cdot 2^{h_s} > 2^{2S}$$

where, $2^{2S}$ is the running time of Grover's quantum-search algorithm and $2^S$ is the running time of a classical search algorithm. For example, S may be 128 or 256 etc. Note that this bound is for the case where the bound on the absolute values of coefficients of the private key polynomials is 1. Similar bound may be established for larger bounds s.

Selection of the private key polynomials may be done probabilistically. Probabilistic private key-generation simplifies implementation. While creating the secret-key $sk_I \in \{0, \pm 1\}^n \leftarrow HWT_n(h_s)$ and $sk_R \in \{0, \pm 1\}^n \leftarrow HWT_n(h_s)^n$, instead of generating $h_s$ non-zero coefficients for the secret-keys, each i-th secret-key coefficient $sk^i$ in this embodiment would be created as follows:

$$sk^i = 1, \text{ with probability} = \left(\frac{h_s}{2n}\right),$$

$$sk^i = -1, \text{ with probability} = \left(\frac{h_s}{2n}\right),$$

$$sk^i = 0, \text{ with probability} = \left(1 - \frac{h_s}{n}\right).$$

Alternatively, if the generation is deterministic, then the following may be done using a standard secure PRF: if there are $h_s$ non-zero elements (either 1 or −1) in a vector of n positions, then the output the PRF selects random positions in the column along with random +1 or −1 values until the PRF selected $h_s$ non-zero elements at different locations. For example, the PRF output may be divided into blocks of $\lceil \log n \rceil + 1$ bits in which the first $\lceil \log n \rceil$ bits of the block identify the position of the non-zero element and the last bit of the block determines if the element is 1 or −1. The vector may be used as the coefficients of the private key polynomial.

The proposed key-exchange has several advantages.

Computational Complexity:

As the secret-key polynomial is sparse and has coefficients, 0, 1, and −1, computations modulo q in our scheme are fast. Specifically, multiplications involving polynomials with a high number of coefficients (for example during the generation of public-keys and raw keys) can be highly optimized.

Communication Complexity:

Due to the use of rounding to a lower modulus, we are able to reduce the size of each coefficient of a public-key and raw key, achieving significantly lower bandwidth requirements. We quantify this in the two following tables, where we demonstrate the bandwidth requirements of our proposed scheme (with and without the use of rounding, respectively). Embodiments are compared to the LWE based protocol described in "Frodo: Take off the ring! Practical, Quantum-Secure Key Exchange from LWE", by J. Bos, C. Costello, L. Ducas, I. Mironov, M. Naehrig, V. Nikolaenko, A. Raghunathan, D. Stebila.

The bandwidth is calculated as the total size of key-exchange messages exchanged (i.e., public-keys and reconciliation data) and does not include the exchange of the public polynomial a.

Above the usage of small sparse secrets in combination with Learning with Rounding (LWR) is described, e.g., for the design of a lattice-based key exchange. Below we give additional embodiments, describe how parameters may be chosen, and several examples are given. Let $Z_q$, for an integer 1, denote the quotient ring Z/qZ. We define R=Z[X]/($X^n$+1) as the ring of integer polynomials modulo $X^n$+1. We use $R_q = Z_q[X]/(X^n+1)$ to denote the ring of integer polynomials modulo $X^n$+1 where each coefficient is reduced modulo q. In case $\chi$ is a probability distribution over R, then $$x \xleftarrow{\$} \chi$$

denotes the sampling of x∈R according to the distribution $\chi$. Writing $$a \xleftarrow{\$} R_q$$

means that all coefficients of the polynomial or vector a are chosen uniformly and randomly from $Z_q$. $D_{Z,\sigma}$ represents the discrete Gaussian distribution over Z parameterized by the Gaussian parameter σ∈ℝ and defined by assigning a weight proportional to $$\exp\left(\frac{-x^2}{2\sigma^2}\right)$$

to all integers x. For integers n, h where 0<h≤n, $HWT_n(h)$ uniformly and randomly samples polynomials or vectors containing n components with exactly h non-zero components from either the distribution {0,1} or from {−1,0,1}. The functions HelpRec( ) and Rec( ) used in the calculation of the reconciliation data and reconciliation of the final shared key respectively are the same as defined in [1]. (References are given below).

In the following steps that are carried out by Alice and Bob (the participants in the key-exchange), $HWT_n(h)$ samples from the ternary distribution {−1,0,1} for the sake of illustration.

As a comparison, we will refer to NewHope [2] and the way NewHope configures its parameters [2]. NewHope is a key exchange scheme based on Ring LWE. However, NewHope uses secret and noise distributions that resemble better the original Gaussian distribution. Thus, when a public key b=as+e (mod q) is computed or when a key is computed v'=bs'+e'' (mod a), the authors propose to use the Number Theoretic Transform. When doing so:

$$\hat{b}=\hat{a}\text{NTT}(s)+\text{NTT}(e) \text{ and } \hat{v}'=\hat{b}\text{NTT}(s')+\text{NTT}(e'')$$

Above, the elements with a hat represent vectors after applying the NTT. $\bar{a}$ is computed directly. And in practice, Alice and Bob exchange the coefficients of $\hat{b}$ and $\hat{b}'$. NTT stands for Number Theoretic Transform.

NTT allows performing operations faster, however, NTT also poses some requirements.

n needs to be a power of two
q is a prime number such that q≡1(mod 2n)

This forces NewHope to choose a relatively large value of n, namely 1024 and simultaneously also determines q. For these parameters, the authors of NewHope then determine the security level that the scheme offers.

A problem addressed by this invention is the choice of parameters using small secrets so that we can choose small configuration parameters that provide a given security level while ensuring good performance.

Note that NewHope [2] discloses configuration parameters. However, there is no alternative to the parameters proposed by the authors of Newhope since n needs to be a power of two so that the proposed choice (n=1024) results in the NTT-based implementation being possible in that setting. However, this is a requirement that is imposed rather by the usage of NTT than by security arguments. Imposing the above restriction on the form of n results in a choice that is larger than necessary in order to also achieve a given security level.

Embodiments described herein use small secrets in combination with rounding that do not require NTT to achieve good performance. Since this scheme does not require NTT, then the values of n and q can be chosen without the constraints imposed by NTT.

Below we disclose embodiments with parameters (q,p,n) fulfilling the following conditions:
a) q is as small as possible
b) a key bit can be computed out of each coefficient of the key vector determining p
c) n is small as possible while ensuring that in combination with the chosen q and an optimal number of samples m, the provided security level is at least λ.

The system computes those parameters (q,p, n) that are then applied by Alice and Bob in a key exchange using small secrets.

The security analysis of a Ring LWE-based KEX involves analyzing the success probability of an attacker with access to the BKZ lattice reduction algorithm and employing an adapted version of the primal attack to solve the unique-SVP problem. This attack is adapted by the attacker in order to exploit the fact that the secret is unusually small and furthermore, even possibly sparse. This adaptation is done using lattice scaling in order to equate the variances of the secret and the noise components in the unique shortest vector that the attacker searches for using lattice reduction, and is inspired by techniques detailed in [3].

Analyzing the success probability of this adapted primal attack yields the smallest value of n that cannot be attacked by a given instance of the BKZ lattice reduction with a given block-size b, assuming one call to the SVP oracle inside the algorithm, and having a running time of $2^{cb}$ CPU clock cycles, where c is an experimental constant for which heuristic estimates already exist.

Below we describe the algorithm to find the smallest parameters (q,p,n) that allow the generation of a key bit per coefficient of the key vector, for the optimal number of samples m, to achieve a given security level A. In an embodiment, this algorithm runs on a server, or on Alice or on Bob that are given the target security level A. Given the security level, they compute the corresponding configuration parameters than are then exchanged and used in the key exchange protocol.

---

Algorithm 1: AttackSuccess(b, q, p, n, m)

Input: b ∈ Z, the block-size of the BKZ lattice reduction algorithm available to the attacker;
q ∈ Z, the large modulus of the Ring-LWR problem;
p ∈ Z, the rounding modulus of the Ring-LWR problem;
n ∈ Z, the dimension of the Ring-LWR problem being attacked;
m ∈ Z, the number of Ring-LWR samples available to the attacker, satisfying 0 ≤ m ≤ 2n.
Output: TRUE if the lattice reduction-based primal attack [2] against the Ring-LWR problem succeeds for the above parameters;
FALSE otherwise.
Steps:

1. $\sigma = \dfrac{q}{2\sqrt{3} \cdot p}$ 2. d = m + n + 1.

Algorithm 1: AttackSuccess(b, q, p, n, m)

3. $\delta = \left(\left(\pi b^{\frac{1}{b}}\right) \cdot \frac{b}{2\pi e}\right)^{1/2(b-1)}$ 4. if $\left(\sigma\sqrt{b} \leq \delta^{2b-d-1} \cdot q^{\frac{m}{d}}\right)$:

return TRUE
5. else:
   return FALSE

---

Algorithm 2: Failure(q, p, n, h, B, $b_h$, keylength)

Input: q ∈ Z, the large modulus of the Ring-LWR problem;
p ∈ Z, the rounding modulus of the Ring-LWR problem;
n ∈ Z, the dimension of the Ring-LWR problem;
h ∈ Z, the hamming-weight of the secret vector of the Ring-LWR problem, satisfying 0 < h ≤ n;
B ∈ Z, the number of bits extracted per polynomial component for creating the final key according to the reconciliation method of [1];
$b_h$ ∈ Z, the number of bits extracted per polynomial component for creating each component of the reconciliation data polynomial according to the reconciliation method of [1];
keylength ∈ Z, the targeted length of the final shared secret in bits.
Output: The expected probability of two parties engaging in a Ring-LWR based key-exchange using the reconciliation method in [1] failing to agree on the final shared secret.
Steps:

1. $\Delta = \frac{p}{2^{B+1}} - \frac{p}{2^{B+b_h+1}}$

2. $p_f = 2\left(\frac{e}{2} - \frac{e\Delta}{2h}\right)^{2h}$

3. $P_f = p_f \cdot \left(\frac{keylength}{B}\right)$

4. Return $P_f$

---

Algorithm 3: CostSVP_IdealLattice(b,SecurityLevel)
Input: b ∈ Z, block-size of the BKZ lattice reduction used to reduce a given ideal lattice basis;
SecurityLevel ∈ {Classical,Post − quantum,Paranoid}.
Output: Cost of running the BKZ lattice reduction algorithm to obtain a reduced basis for a given ideal lattice (basis).
Steps:
1. if SecurityLevel == Classical:
2.   T = $2^{0.292b}$
3. else if SecurityLevel == Post − quantum:
4.   T = $2^{0.265b}$
5. else if SecurityLevel == Paranoid:
6.   T = $2^{0.2075b}$
7. else:
8.   T = −1 //Undefined security level
9. return T

---

Algorithm 4: GetParams($q_{min}$, $q_{max}$, σ, targetFailure, $n_{min}$, $m_{max}$, B, $b_h$)

Input: $q_{min}$ ∈ Z, the smallest value of the Ring-LWR large modulus for which secure and operational parameters will be evaluated;
$q_{max}$ ∈ Z, the largest value of the Ring-LWR large modulus for which secure and operational parameters will be evaluated;
σ, standard deviation of a discrete Gaussian distribution suitable for sampling (Ring)LWE noise from;
targetFailure, the maximum acceptable failure probability of the Ring-LWR key-exchange;
$n_{min}$ ∈ Z, a small starting value for the evaluation of n;
$m_{max}$ ∈ Z, maximum number of Ring-LWR samples that can be queried by the attacker;
B ∈ Z, the number of bits extracted per polynomial component for creating the final key according to the reconciliation method of [1];
$b_h$ ∈ Z, the number of bits extracted per polynomial component for creating each component of the reconciliation data polynomial according to the reconciliation method of [1];
keylength ∈ Z, the targeted length of the final shared secret in bits.
Output: A list of (SecurityLevel, q, p, n, m, keylength, B, $b_h$) tuples that are secure and operationally correct.

-continued

Algorithm 4: GetParams($q_{min}$, $q_{max}$, σ, targetFailure, $n_{min}$, $m_{max}$, B, $b_h$)

Steps:
1. SecurityLevels = [Classical,Post − quantum,Paranoid]
2. for l = 0, ... ,2:
   a. if l == 0:
      i. Find b such that CostSVP_IdealLattice(b,Classical) ≥ 128
      ii. keylength = 128
   b. if l == 1:
      i. Find b such that $CostSVP_{IdealLattice(b,Post-quantum)}$ ≥ 128
      ii. keylength = 256
   c. if l == 2:
      i. Find b such that $CostSVP_{IdealLattice(b,Paranoid)}$ ≥ 128
      ii. keylength = 256
   d. q = $q_{min}$
   e. while q < $q_{max}$,do:
      i. n = $n_{min}$ //Starting value of n
      ii. continue = TRUE //A Boolean flag
      iii. m = 0 //Minimum number of Ring-LWR samples available to an attacker
      iv. Choose p as a power of 2, satisfying $p \leq \dfrac{q}{2\sqrt{3} \cdot \sigma}$
      v. while(continue),do:
         1. if AttackSuccess(b,q,p,n,m): //Attack success signifies either
           that dimension n is too small and the corresponding Ring-LWR
           problem is too easy, or that m is large enough and therefore the
           attacker has enough samples to solve the problem.
           a. n = n + 1 //Try a larger value of n for which the Ring-LWR
           problem is hopefully secure
           b. m = 0 //Reset the value of m
         2. else: //Attack failure signifies either that n is too large and the Ring-LWR
           problem too hard, or that m is not large enough and therefore
           the attacker does not yet have enough samples to solve the problem.
           a. m = m + 1 //Attacker queries more Ring-LWR samples
             and tries solving again
           b. if (m ≥ $m_{max}$): //Limit of samples reached. Attacker can
           query no more Ring-LWR samples. Current dimension n safe
           for all possible m.
             i. if(Failure(q,p,n,h,B,$b_h$,keylength) <
             targetFailure): //Security condition satisfied,
             now check operational correctness.
                1. return
                   (SecurityLevel,q,p,n,m,keylength,B,b
                   . //Current parameter tuple is both secure
                   and satisfies the target failure probabilty.
             ii. continue = FALSE //Break
      vi. q = q * 2 //Obtain secure, operationally correct parameters for next q The latter algorithm produces appropriate values for n and p for different values of q. Next an optimization over q may be done, e.g., to pick parameters with a low bandwidth requirement. Preferably, p should be a power of 2 for best possible implementations. Instead of choosing p as a power of 2, satisfying $$p \leq \frac{q}{2\sqrt{3} \cdot \sigma}$$

(e.g., as large as possible), one may also loop over p values. Especially if both p and q are powers of 2.

Preferably, p should be a factor of q so that the reconciliation success condition analysis we did is correct (one of the steps in the calculation of the condition needs this requirement.) This condition is automatically satisfied if (1) is satisfied. Security: the ratio q/p should be large enough that the rounding error's variance is almost the same as the variance of an equivalent Gaussian error.

Advantages of the KEX Based on Small Secrets with LWR:

Since secret-keys in the key-exchange consist of small components (ternary or binary), polynomial multiplications modulo ($X^n$+1) can be carried efficiently even without requiring operations of the polynomials in the number-theoretic transform (NTT) domain, such as is done in [1].

Due to this reason, no additional restrictions are placed on the value of n and q except that which are dictated by the security analysis. Also, it is feasible to use LWR (not feasible with NTT). An important advantage is thus that a smaller value of n can be chosen that reduces the bandwidth requirements.

Bandwidth for the Newhope Ring-LWE based key-exchange scheme is calculated as follows:

$$\text{Bandwidth}_{Newhope} = (2 \cdot 1024 \cdot \lceil \log_2 12289 \rceil) + (256 \cdot 8)$$

Bandwidth for the sp-terRING-LWE based key-exchange scheme is calculated as follows:

$$\text{Bandwidth}_{sp\text{-}terRING\text{-}LWE} = (2 \cdot n \cdot \lceil \log_2 q \rceil) + (\text{keylength} \cdot b_h)$$

The parameter $b_h$ represents the number of bits extracted per component of Bob's raw-key polynomial v' for the creation of each component of the reconciliation data polynomial r, and is taken as 2 for all the above key-exchanges and security-levels, based on an improved reconciliation mechanism due to [1].

When comparing our approach with the parameters of NewHope, we consider the following cases.
  a) Without constraints on n, but for the same q as in NewHope, performance increase for sparse, ternary secrets in Ring-LWR.

TABLE 1

Largest problem dimensions of Ring-LWR susceptible to the primal attack using BKZ with block-size 'b' such that the cost of running BKZ-b is at least $2^{128}$ and key agreement failure probability is at most $2^{-60}$. Noise polynomial is sampled from a discrete Gaussian distribution of standard deviation $\sqrt{8}$. Hamming-weight of secret polynomials in sp-terRING-LWR is 0.2n. Bandwidth is calculated including reconciliation data calculated based on [1].

| Security Level | Keylength | q | n, (sp-terRING-LWR) | Bandwidth (NewHope) | Bandwidth (sp-terRING-LWR) | Ratio with NewHope |
|---|---|---|---|---|---|---|
| Classical (b = 438) | 128 bits | 12289 | 646 | 3.64 KB | 1.6 KB | 0.44 |
| Quantum (b = 483) | 256 bits | 12289 | 701 | 3.64 KB | 1.77 KB | 0.49 |
| Paranoid (b = 617) | 256 bits | 12289 | 856, | 3.64 KB | 2.15 KB | 0.6 |

However, we note that for this value of q it is not feasible to perform the same key reconciliation as in [1].
  b) Without putting constrains on the (n,q) used in NewHope, performance increase for sparse, ternary secrets in Ring-LWR

TABLE 2

Largest problem dimensions of Ring-LWR susceptible to the primal attack using BKZ with block-size 'b' such that the cost of running BKZ-b is at least $2^{128}$ and key agreement failure probability is at most $2^{-60}$. . Hamming-weight of secret polynomials in sp-terRING-LWR is 0.2n. Bandwidth is calculated including reconciliation data calculated based on [1].

| Security Level | Keylength h | q | p | $b_h$ | n, (sp-terRING-LWR) | Bandwidth (NewHope) | Bandwidth (sp-terRING-LWR) | Ratio with NewHope |
|---|---|---|---|---|---|---|---|---|
| Classical (b = 438) | 128 bits | $2^{13}$ | $2^8$ | 2 | 551, | 3.64 KB | 1.1 KB | 0.30 |
| Quantum (b = 483) | 256 bits | $2^{13}$ | $2^8$ | 2 | 601, | 3.64 KB | 1.24 KB | 0.37 |
| Paranoid (b = 617) | 256 bits | $2^{13}$ | $2^8$ | 3 | 736, | 3.64 KB | 1.53 KB | 0.42 |

Note that we use a value of q equal to a power of two so that we can apply the key reconciliation method in [1]. Note that we use a value of p equal to a power of two in other to improve performance.

Bandwidth for the Newhope Ring-LWR based key-exchange scheme is calculated as follows:

$$\text{Bandwidth}_{Newhope}=(2\cdot 1024\cdot \lceil \log_2 12289 \rceil)+(256\cdot 8)$$

Bandwidth for the terRING-LWR based key-exchange scheme is calculated as follows:

$$\text{Bandwidth}_{sp\text{-}terRING\text{-}LWE}=(2\cdot n\cdot \lceil \log_2 p \rceil)+(\text{keylength}\cdot b_h)$$

Bandwidth for the sp-terRING-LWR based key-exchange scheme is calculated as follows:

$$\text{Bandwidth}_{sp\text{-}terRING\text{-}LWE}=(2\cdot n\cdot \lceil \log_2 p \rceil)+(\text{keylength}\cdot b_h)$$

The parameter $b_h$ represents the number of bits extracted per component of Bob's raw-key polynomial v' for the creation of each component of the reconciliation data polynomial r, Note the removing the restrictions on the parameters due to NTT allows us the flexibility to optimize the analysis of security and operational correctness. For the computed parameters, we require 0.41 times the bandwidth compared to the Newhope key-exchange scheme when using rounding, for post-quantum security levels. Furthermore, abandoning NTT does not cause any significant drop in performance, assuming implementations optimized to take advantage of sparse, small secrets.

1. L. Tolhuizen, O. Garcia Morchon, R. Rietman, "Reaching agreement on a secret value", First filing, Phillips reference 2016P01227EP, Nov. 4, 2016. Filed with the European patent office with application Ser. No. 16/197,277.3
2. E. Alkim, L. Ducas, T. Poeppelmann, P. Schwabe. Post-quantum key-exchange—a new hope. Cryptology ePrint Archive, Report 2015/1092, https://eprint.iacr.org/2015/1092.pdf.
3. S. Bai, S. D. Galbraith. Lattice Decoding Attacks on Binary LWE. Cryptology ePrint Archive, Report 2013/839, https://eprint.iacr.org/2013/839.pdf.

Figure 6A:
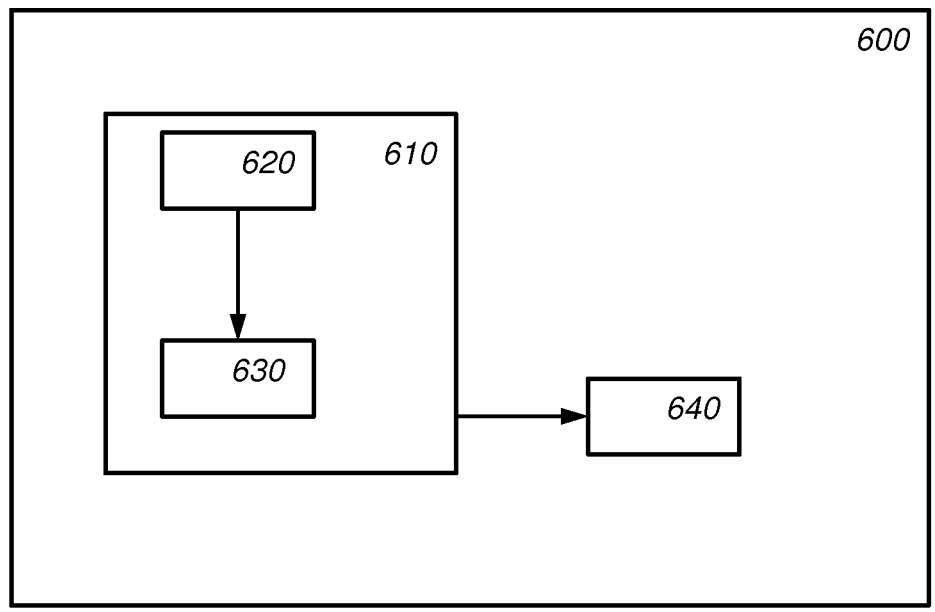

FIG. 6a schematically shows an example of an embodiment of a parameter selection device 600. As devices 110, 210, 510, 520, also device 600 may comprise a processor circuit and an electronic memory, said memory storing computer code executable by the processor circuit. Said computer code configuring the device, e.g., implementing a corresponding method. Alternative embodiments may implement all or part of the functionality in hardware, or in a hybrid of hardware and software. Below units of device 600 are defined; these may be regarded as unit that can be implemented in software/hardware, etc. Device 600 is configured for selecting parameters for use in a network node. In particular, the parameters p, q, and n but also other parameters may be optimized, e.g., h or B, etc. Device 600 may be used by a designer of cryptographic protocols, but, device 600 may also be used as part of a hand-shake before executing one or multiple key agreement protocols such as described herein.

Device 600 performs the optimization in two steps. First multiple parameter set are generated. Next an optimization is performed over the parameter sets that are found, e.g., by selecting one that has desirable characteristics, e.g., low bandwidth, low computing requirements, etc.

Device 600 comprises a parameter set generator 610. Parameter set generator 610 is configured to generate multiple possible parameter sets. For example, the parameter sets include at least a first modulus (q), a second modulus (p), and a number of coefficients (n) of the shared polynomial (a). Parameter set generator 610 comprises a p, q selection unit 620 configured to generate multiple pairs of a first modulus (q) and a second modulus (p). For example, p, q selection unit 620 may run over multiple possible values of q, and select p according to a fixed bound, e.g., as defined above. In the latter case a known amount of noise is introduced into the scaling operation. This is not necessary though. Both p and q could be varied independent from each other. The checks on the security of the choices would then filter out bad combinations of p and q. The values for p and q are may be chosen to be practical, e.g., a power of two, and within reasonable bounds, e.g., between 7 and 16 bits, or the like.

For example, in an embodiment, q is varied between (inclusive) $2^8$ and $2^{16}$, p may be varied independently from q; for example, p may be varied between (inclusive) $2^4$ and $2^{12}$. p may also be chosen as large as possible according to the bound $$p \le \frac{q}{2\sqrt{3} \cdot \sigma}.$$

This will ensure that noise will be introduced as indicated by σ. For example, σ may be chosen as $\sqrt{8}$ or $\sqrt{12}$, or in between. A larger noise level will be good for security, as less information can be derived from data exchanged between the nodes. On the other hand, a higher noise level increases the failure probability.

Device 600 further comprises an n, m optimizer 630. n, m-optimizer 630 is configured to search for a safe number of coefficients (n) for a given pair of moduli. Selecting a safe n is not straightforward, as it depends on the number of message m that an attacker will take into account. If an attacker will take only few messages into account, e.g., the exchanged information such as the shared polynomial and the public keys, a lower value of n will suffice. As m increases the least safe value for n will increase. However, at some point taking more messages into account will incur some much more work from the attacker that the additional information he could extract from the additional messages does not worth the increased workload. In other words, for any given n, p and q there is an optimal number of messages for the attacker to take into account.

This interplay makes it difficult to select a safe n. Especially, if it is desired that the n is small. It might seem tempting when searching for a safe n to just set the m to some large maximal value. After all, one want to be safe even if the attacker analyzes a large amount of traffic. However, this would lead unrealistically, and unsecure values of n. Taking into account a large amount of message is so much work, that only a relatively small n is sufficient to make it infeasible. Where the attacker to reduce the number of messages to analyze, the required n might increase. This is why, simply setting $m=m_{max}$ will not work.

n, m-optimizer 630 addresses this problem as follows. It is configured to first initializing a number of coefficients (n) and a number of samples (m) used by an attacker (m). For example, n may be set to an $n_{min}$ say to a 100, and m to an $m_{min}$ say to 0 or to 1.

Given setting, the n, m-optimizer 630 determines if the set is secure or not. If it is not secure, it increases n; if it is secure it increases m. The process terminates when m reached some maximal value $m_{max}$. At this point we have found an n which is secure for all reasonable number of messages m. As long is n is large enough, eventually the system will be secure. To avoid too long running of the algorithm a maximum value of n may also be enforced, say 1000 bits, or so.

At this point a triple n, p, q is found that is secure. It may happen however that the set will have a too low probability of reaching a successful shared key. Next device 600, e.g., parameter set generator 610, verify operational correctness of the parameter set. If the operational correctness is not verified (e.g. too low success probability) the parameter set is discarded; if it operational correctness is verified, the parameter set may be added to a list. The search can now be continued with a new pair of moduli.

Finally, when multiple secure parameter sets are found, an optimization may be performed over the found sets. For example, a parameter set with a lower bandwidth requirement may be selected. For example, the lowest bandwidth requirement may be chosen. Or lower than a threshold. In the latter case, also other factors may be taken into account, for example, computational efficiency. It is preferred for example, if the moduli stay at or just below natural computer word boundaries, e.g., 8, 16, bits, rather than going just above them.

Device 600 comprises an output interface 120 arranged to output the selected parameter set. For example, the output interface may be a display, e.g., a monitor. The output interface may be configured to send a digital message, e.g., an email, a digital report etc. Output interface 120 may comprise a computer port.

Figure 6B:
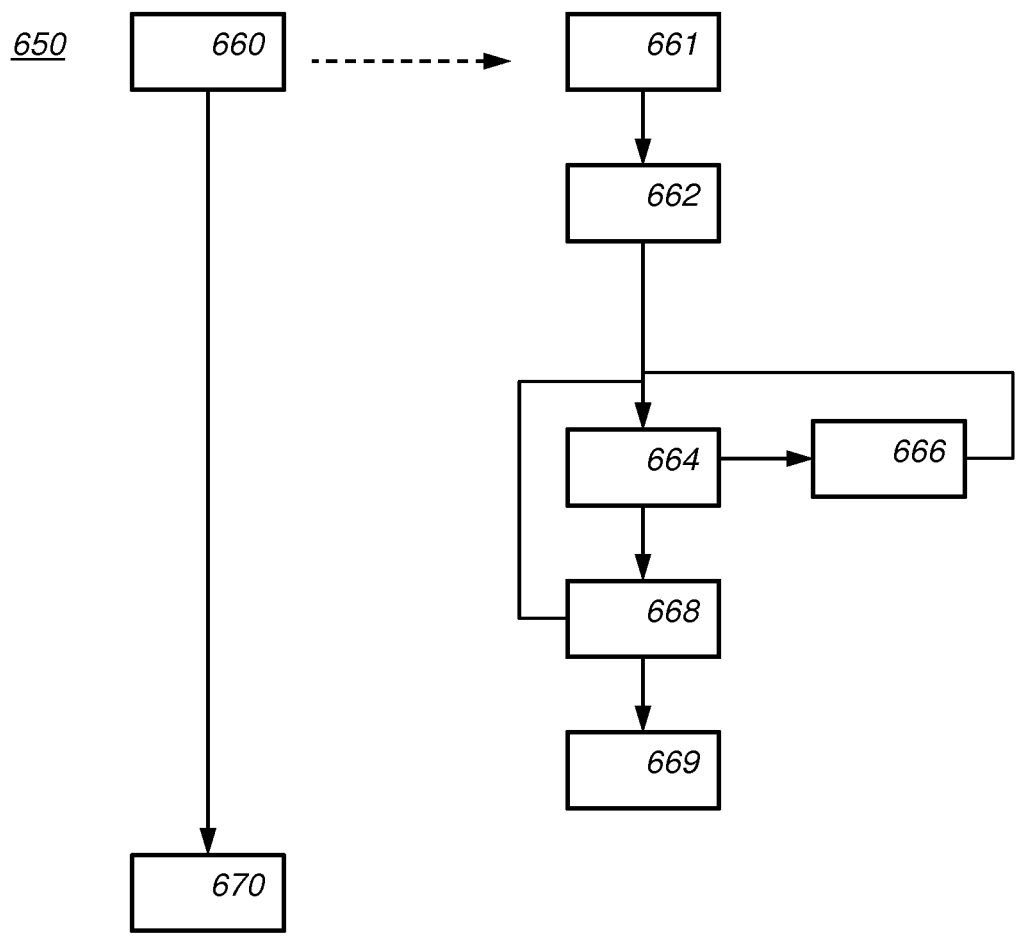

FIG. 6b schematically shows an example of an embodiment of a parameter selection method 650. For example, method 650 may be executed on a computer, on a device such as device 600, etc.

Method 650 comprises generating 660 multiple possible parameter sets, a parameter set including at least a first modulus q, a second modulus p, and a number of coefficients n of the shared polynomial a. For example, generating a parameter set may be done according to the flowchart on the right side of FIG. 6b.

Generating 660 may comprise generating 661 multiple pairs of a first modulus a and a second modulus p. Next the pair of moduli is analyzed for security by searching for a safe number of coefficients n for the pair. This analyzing may comprise initializing 662 a number of coefficients n and a number of samples m used by an attacker m.

Next, in a decision box 664 it is determined if an attack on the parameters set with the give pair, a number of coefficients n and a number of samples m is possible.

If an attack is possible, then the algorithm continues at 666 with increasing the number of coefficients n and resetting of the number of samples used m.

If an attack is not possible, then the algorithm continues at 668 with increasing the number of samples m.

In both cases, the algorithm returns to the deterring box 664.

If the number of samples m exceeds a maximum number of samples, e.g., as may also be determined in part 668, then the algorithms continues to verify 669 the operational correctness of the parameter set.

Finally, when multiple parameter sets have been found, the algorithm selects at 670 from the multiple parameter sets a parameter sets with a lower bandwidth requirement.

Determining operational correctness, attack-ability, and bandwidth requirement can be done using dedicated functions or routines that estimate these variables. For example, how well a parameter set may be attack can be estimated by extrapolating known bounds.

Figure 5:
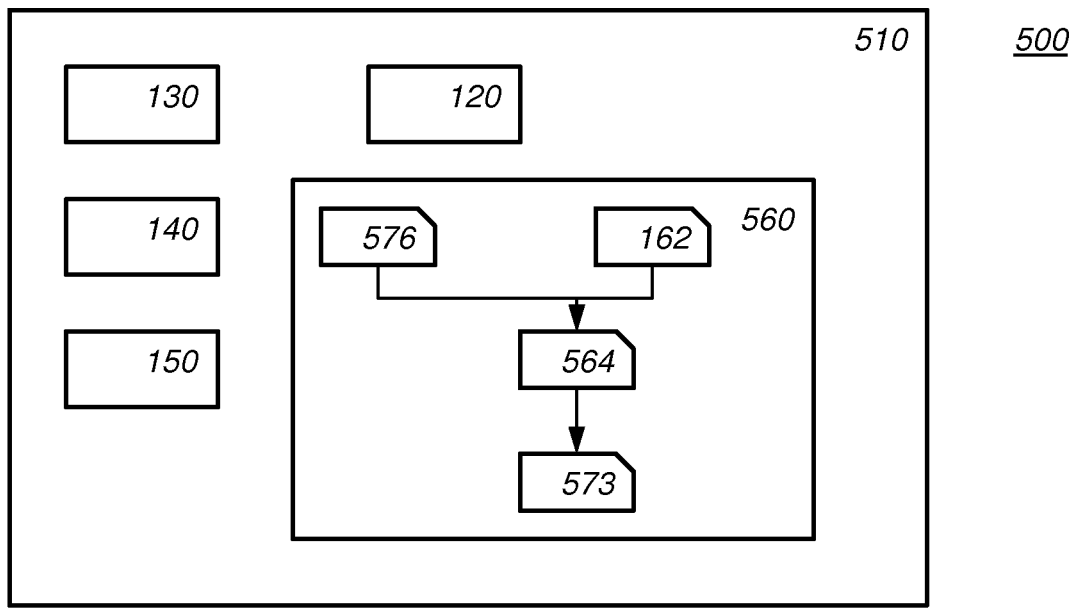
FIG. 5 schematically shows an example of an embodiment of a key agreement network, FIG. 6a schematically shows an example of an embodiment of a parameter selection device, FIG. 6b schematically shows an example of an embodiment of a parameter selection method.
Figure 5:
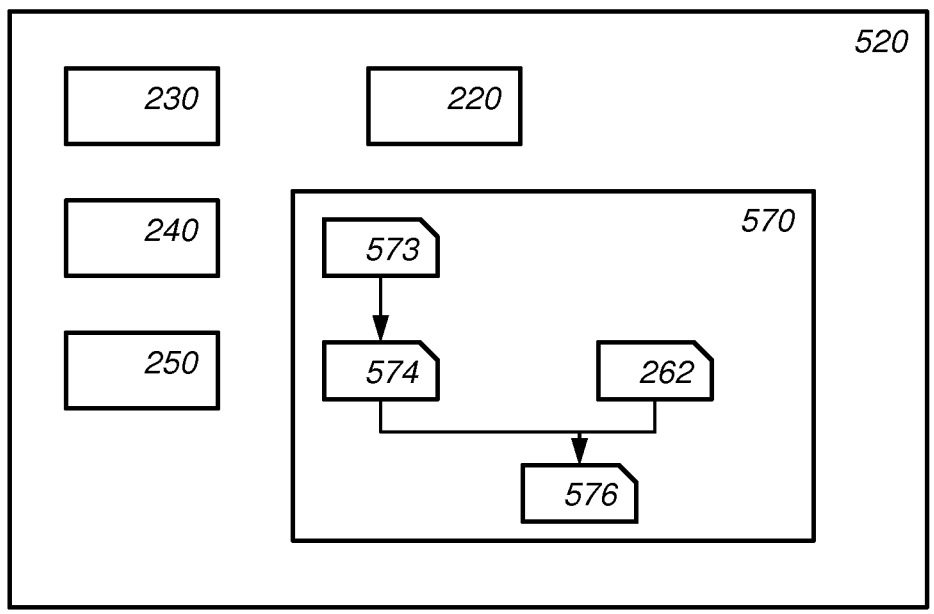

FIG. 5 schematically shows an example of an embodiment of a key agreement network 500. Key agreement network 500 is based comprises an initiator node 510 and a responder node 520. Key agreement network 500, initiator node 510 and responder node 520 are based on key agreement network 100, initiator node 110 and responder node 120. Networks 500 and 100 can use the same or similar underlying rings, parameters and the like. An important difference between network 500 and network 100 is that in the latter the shared key is based on the raw key that each party generate, but in network 500 the shared key is independent therefrom. In the embodiment below, we will assume that the shared key is generated by the responder node 520, but this is not limiting. In fact, any key can be shared using this mechanism. For example, the shared key can be obtained from a further source, e.g., from some other protocol or from a storage, etc. For example, the key can be jointly generated, etc.

As in network 100, the nodes obtain a shared polynomial (a), generate a private key polynomial and generate a public key polynomial. The latter comprising computing the polynomial product between the shared polynomial (a) and the private key polynomial modulo a first modulus q obtaining a polynomial product, reducing the polynomial product modulo q reduction polynomial, and scaling the coefficients down to mod p. The public keys are exchanged and a raw key is computed at each side, e.g., as the polynomial product between the received public key and the node's own private key polynomial mod p, followed by reduction modulo q reduction polynomial. However, different from network 100, the shared is not directly derived from the raw key, rather the raw key is used to encapsulate the generated shared key.

Responder node 520 comprises a key sharing unit 570 configured to obtain a key for sharing and to encapsulate the shared key with the raw key. The encapsulated shared key is sent to the initiator node. The initiator node 510 also comprises a shared key unit 560 configured receive an encapsulated shared key and to de-encapsulate the encapsulated shared key with this raw key. In this way, node 510 obtains the shared key as well.

The key encapsulation of the shared key with the raw key is chosen in such a way that a small difference in the raw keys results in a small error in the de-encapsulated shared key and at the same time the encapsulated shared key comprises enough redundancy to correct such small errors.

For example, one way to encapsulate a shared key is as follows. First, shared key unit 570 generates a shared key 573 (or otherwise obtains the key which is to be shared). Shared key 573 is encoded. A first way to encode the shared key to multiply it with half the second modulus p/2. A second way is to use an error correcting code.

The resulting encoded shared key is added to raw key 262. For example, one may regard the shared key 262 as a polynomial with coefficients mod p. In this case, one may select the error correcting code as a repetition code over $Z_p$. At the other side, node 510 comprises a key sharing unit 560 configured to subtract the raw key 162 from the received encapsulated key 576 to recover the encoded key 564. The latter will differ from encoded key 574 because of differences between raw keys 162 and 262. For resulting encode key contains sufficient information so the original encoded shared key can often be reconstructed. Consider the example in which the node 520 multiplied the shared key. In that node 510 will find values close to zero if the original encoded shared key had a zero, and values close to p/2 if the original encoded shared key had a p/2. A hard decision decoder at node 510 can map the subtraction to the closest values.

More assurance of obtaining the same shared key can be obtained by using an error correcting code. For example, the shared key 573 may be encoded bit-wise to the error correcting code. One may also translate larger blocks of the shared key 573 at a time. For example, one may map a zero-bit in shared key 573 to (0, 0, 0) and a 1 bit to (p/2,p/2,p/2). In this case, the shared key 573 is about ⅓ of the length of the raw key 262. Minor differences in length may be resolved with padding. This repetition code may be decoded with majority decoding. A better result is obtained by adding the three values corresponding to the same bit in the shared key. Without errors, the latter ought to be 0 or 3p/2; by mapping to the closest value a better decoding is obtained. The corrected encoded shared key may be mapped to a shared key.

It is advantageous to select the shared key 573 too long, and later hash it down to the desired key length, e.g., using a KDF. For example, if n is 1024, one may take the bit-length of shared key 573 as 341, and later obtain a 128-bit key from it. Another approach is to map the raw key 262 to a binary string first. For example, deriving B bits from each coefficient and concatenating the result. This has the advantage that much smaller code can be used.

Below a possible embodiment is given:

| KEX Initiator | KEX Responder |
|---|---|
| Agrees upon a fresh a ← $R_q$ with peer, chooses a fresh, secret $sk_I$ ← $HWT_n(h_s)$, p ∈ Z such that p < q and p\|q. | Agrees upon a fresh a ← $R_q$ with peer, chooses a fresh, secret $sk_R$ ← $HWT_n(h_s)$, p ∈ Z such that p < q and p\|q. |
| $pk_I = \left\lfloor \left(\frac{p}{q}\right) \cdot \{a \cdot sk_I (\bmod\ q)\} \right\rceil.$ | $pk_R = \left\lfloor \left(\frac{p}{q}\right) \cdot \{sk_R \cdot a (\bmod\ q)\} \right\rceil.$ |

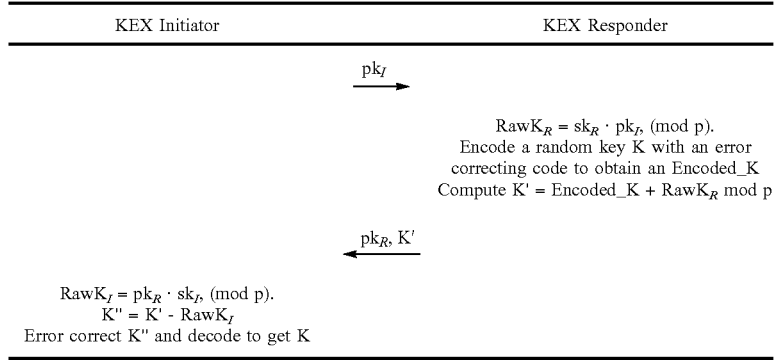

In the various embodiments, the communication interface may be selected from various alternatives. For example, communication interface may be a network interface to a local or wide area network, e.g., the Internet, a storage interface to an internal or external data storage, a keyboard, etc.

The network nodes may comprise an electronic storage, e.g., to store intermediate data such the polynomial a, the public and private key polynomials, and the shared key, etc. The storage may be implemented as an electronic memory, say a flash memory, or magnetic memory, say hard disk or the like. The storage may comprise multiple discrete memories together making up storage. The storage may also be a temporary memory, say a RAM. In the case of a temporary storage, the storage may use some means to obtain common parameters before use e.g. by obtaining them over an optional network connection (not separately shown).

Typically, the devices 110, 210, 510, 520, 600 each comprise a microprocessor (not separately shown in FIG. 1) which executes appropriate software stored at the devices 110, 210, 510, 520, 600; for example, that software may have been downloaded and/or stored in a corresponding memory, e.g., a volatile memory such as RAM or a non-volatile memory such as Flash (not separately shown). Alternatively, the devices 110, 210, 510, 520, 600 may, in whole or in part, be implemented in programmable logic, e.g., as field-programmable gate array (FPGA). Devices 110, 210, 510, 520, 600 may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, a network node comprises a communication interface circuit, a shared polynomial circuit, a private key polynomial circuit, a public key polynomial circuit, and a shared key circuit. The circuits implement the corresponding units described herein. The circuits may be a processor circuit and storage circuit, the processor circuit executing instructions represented electronically in the storage circuits.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only. The circuits may also be, FPGA, ASIC or the like.

Figure 3:
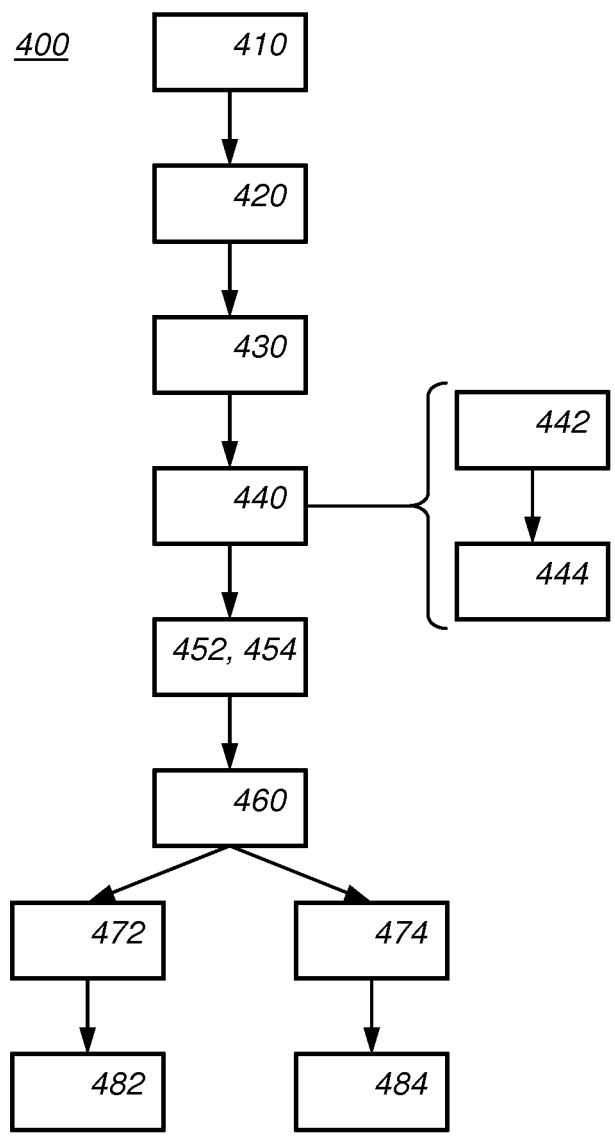

FIG. 3 schematically shows an example of an embodiment of an electronic key exchange method. The method may be executed by a first electronic network node, such as initiator node 110 or responder node 210.

Method 400 comprises arranging (410) digital communication between the first network node and a second network node, obtaining (420) a shared polynomial (a), the shared polynomial being shared with the second network node through the digital communication, coefficients of the shared polynomial a being selected modulo a first modulus q, generating (430) a private key polynomial ($sk_1$), coefficients of the private key polynomial being bounded in absolute value by a bound (s), generating (440) a public key polynomial ($pk_I$) by computing (442) a polynomial product between the shared polynomial (a) and the private key polynomial ($sk_I$) modulo the first modulus (q) obtaining a polynomial product, followed by reduction modulo q reduction polynomial scaling (444) the coefficients of the polynomial product down to a second modulus (p), a scaled coefficient being equal to the unscaled coefficient multiplied with the second modulus (p), divided by the first modulus (q) and rounded to the nearest integer, the second modulus (p) being smaller than the first modulus (q), the bound (s) being at most the second modulus (p), sending (452) the public key polynomial of the first network node to the second network node, receiving (454) a public key polynomial ($pk_R$) of the second network node, computing (460) a raw key as a polynomial product between the received public key of the second node and the private key polynomial of the first network node modulo the second modulus (p), followed by reduction modulo q reduction polynomial If the first network node is operating according to an initiator mode, then the first network node may perform the following further elements according to an embodiment.

receiving (472) reconciliation data (h) of the second network node, computing (482) a shared key by applying a reconciliation function (rec) to the received reconciliation data and the raw key.

If the first network node is operating according to a responder mode, then the first network node may perform the following further elements according to an embodiment.

obtaining (474) the shared key and reconciliation data from the raw key, sending (484) the reconciliation data to the first network node.

As pointed out herein, other types of helper data may also be employed in method 400.

Many different ways of executing the methods are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, a given step may not have finished completely before a next step is started.

A method according to the invention may be executed using software, which comprises instructions for causing a processor system to perform method 400 or 650. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 4A:
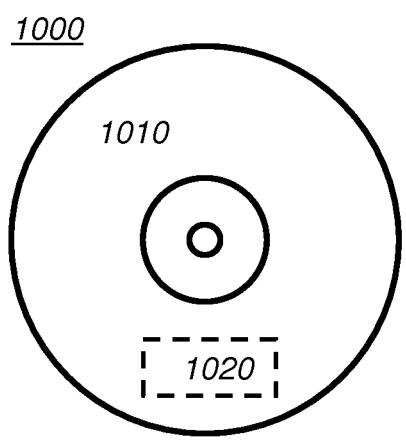

FIG. 4a shows a computer readable medium 1000 having a writable part 1010 comprising a computer program 1020, the computer program 1020 comprising instructions for causing a processor system to perform a key agreement method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said key agreement method 400.

Figure 4B:
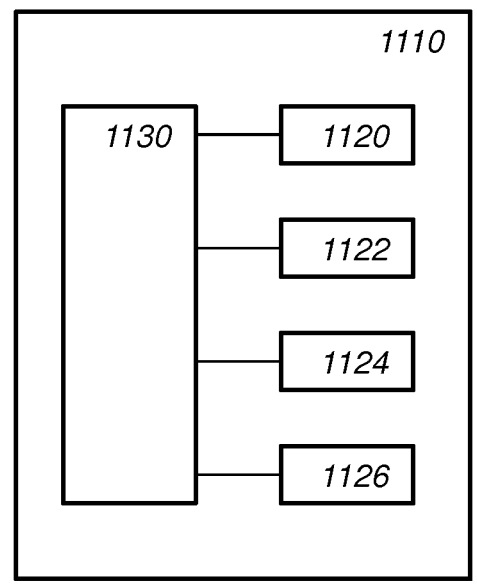

FIG. 4b shows in a schematic representation of a processor system 1140 according to an embodiment, e.g., as a first or second network node. The processor system comprises one or more integrated circuits 1110. The architecture of the one or more integrated circuits 1110 is schematically shown in FIG. 4b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

A computer readable medium 1000 or a processor system 1140 may also be configured for a method of selecting parameters For example, in an embodiment, a network node may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the verification device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

The following clauses are not the claims, but include contemplated embodiments. The Applicant hereby gives notice that new claims may be formulated to such clauses and/or combinations of such clauses and/or features taken from the description or claims, during prosecution of the present application or of any further application derived therefrom.

Clause 1. A first electronic network node (110) configured for a key agreement protocol, the first network node comprising a communication interface (120) arranged for digital communication with a second network node, and a processor circuit configured to obtain a shared polynomial (a), the shared polynomial being shared with the second network node through the communication interface, coefficients of the shared polynomial (a) being selected modulo a first modulus q, generate a private key polynomial ($sk_I$; $sk_R$), coefficients of the private key polynomial being bounded in absolute value by a bound (s), generate a public key polynomial ($pk_I$; $pk_R$) by computing a polynomial product between the shared polynomial (a) and the private key polynomial ($sk_I$) modulo the first modulus (q) obtaining a polynomial product, scaling coefficients of the polynomial product down to a second modulus (p), a scaled coefficient being equal to the unscaled coefficient multiplied with the second modulus (p), divided by the first modulus (q) and rounded to the nearest integer, the second modulus (p) being smaller than the first modulus (q), the bound (s) being at most the second modulus (p), send the public key polynomial of the first network node to the second network node, receive a public key polynomial ($pk_R$; $pk_I$) of the second network node, compute a raw key polynomial as a polynomial product between the received public key of the second node and the private key polynomial of the first network node modulo the second modulus (p), and compute the shared key from the raw key.

Clause 2. An electronic key agreement method (400) for a first electronic network node (110), the method comprising arranging (410) digital communication between the first network node and a second network node, obtaining (420) a shared polynomial (a), the shared polynomial being shared with the second network node through the digital communication, coefficients of the shared polynomial a being selected modulo a first modulus q, generating (430) a private key polynomial ($sk_I$), coefficients of the private key polynomial being bounded in absolute value by a bound (s), generating (440) a public key polynomial ($pk_I$) by
  computing (442) a polynomial product between the shared polynomial (a) and the private key polynomial ($sk_I$) modulo the first modulus (q) obtaining a polynomial product
  scaling (444) the coefficients of the polynomial product down to a second modulus (p), a scaled coefficient being equal to the unscaled coefficient multiplied with the second modulus (p), divided by the first modulus (q) and rounded to the nearest integer, the second modulus (p) being smaller than the first modulus (q), the bound (s) being at most the second modulus (p), sending (452) the public key polynomial of the first network node to the second network node, receiving (454) a public key polynomial ($pk_R$) of the second network node, computing (460) a raw key polynomial as a polynomial product between the received public key of the second node and the private key polynomial of the first network node modulo the second modulus (p), and compute the shared key from the raw key In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A first network node configured for a key agreement protocol, the first network node comprising:
  a communication interface circuit, wherein the communication interface circuit is arranged for digital communication with a second network node; and
  a processor circuit,
  wherein the processor circuit is configured to obtain a shared polynomial (a),
  wherein coefficients of the shared polynomial (a) are selected modulo a first modulus q,
  wherein the processor circuit is configured to generate a private key polynomial ($sk_I$; $sk_R$),
  wherein coefficients of the private key polynomial are bounded in absolute value by a bound (s),
  wherein the bound (s) is smaller than a second modulus (p),
  wherein the second modulus (p) is smaller than the first modulus (q),
  wherein the processor circuit is configured to generate a public key polynomial ($pk_I$; $pk_R$), the generation comprising:
    computing a polynomial product between the shared polynomial (a) and the private key polynomial ($sk_I$) modulo the first modulus (q) obtaining a polynomial product; and
    scaling coefficients of the polynomial product down to the second modulus (p), wherein a scaled coefficient is equal to the unscaled coefficient multiplied with the second modulus (p), divided by the first modulus (q) and rounded to the nearest integer,
  wherein the processor circuit is configured to send the public key polynomial of the first network node to the second network node,
  wherein the processor circuit is configured to receive a public key polynomial ($pk_R$; $pk_I$) of the second network node,
  wherein the processor circuit is configured to compute a raw key polynomial, wherein the raw polynomial is a polynomial product between the received public key of the second node and the private key polynomial of the first network node modulo the second modulus (p),
  wherein the processor circuit is configured to compute a shared key from the raw key,
  wherein the first network node is configured to receive reconciliation data (h) of the second network node,
  wherein the first network node is configured to compute the shared key by applying a reconciliation function (rec) to the received reconciliation data and multiple coefficients of the raw key polynomial.

2. The first network node as in claim 1,
  wherein the first network node is configured to receive helper data of the second network node,
  wherein the helper data comprises information allowing deriving of the same shared key at the first and second node such that differences are cancelled between the raw keys computed at the first and second nodes,
  wherein the first network node is configured to compute the shared key from the helper data and multiple coefficients of the raw key polynomial.

3. The first network node as in claim 1, wherein the bound (s) in absolute value of coefficients of the private key polynomial ($sk_I$, $sk_R$) is 2 (s=2), or wherein the bound is 1 (s=1), the latter corresponding to signed binary.

4. The first network node as in claim 1,
  wherein the first network nodes is configured with a predetermined number ($h_s$) of non-zero coefficients,
  wherein the private key polynomial ($sk_I$) is generated with at most the number ($h_s$) of non-zero coefficients.

5. The first network node as in claim 1, wherein the second modulus (p) divides the first modulus (q).

6. The first network node as in claim 1, wherein the second modulus (p) and/or the first modulus (q) is a power of 2.

7. The first network node as in claim 1, wherein the first network node is arranged to obtain a fresh shared polynomial (a) and a fresh private key for each new key exchange.

8. The first network node as in claim 1, wherein reconciliation data is obtained, sent, received, and applied for fewer than all coefficients of the raw key polynomial.

9. The first network node as in claim 1, wherein the size of the reconciliation data is at least two 2 bits per corresponding coefficient of the raw key polynomial.

10. The first network node as in claim 1,
wherein the first modulus (q) has as bit size of at least 12, and
wherein the second modulus (p) has as bit size of at least 7.

11. The first network node as in claim 1, wherein the polynomial product between the shared polynomial (a) and the private key polynomial ($sk_I$) and the polynomial product between the received public key of the second node and the private key polynomial of the first network node are both modulo a reduction polynomial.

12. The first network node as in claim 1,
wherein the first network node is configured with a predetermined number ($h_s$) of non-zero coefficients,
wherein the private key polynomial ($sk_I$; $sk_R$) is chosen from a probability distribution,
wherein the probability distribution has a fixed expected number ($h_s$) of non-zero coefficients for the private key polynomial ($sk_I$; $sk_R$).

13. The first network node as in claim 1, wherein the first network node is arranged to obtain a fresh shared polynomial (a) or a fresh private key for each new key exchange.

14. The first network node as in claim 1, wherein reconciliation data is obtained, sent, received, or applied for fewer than all coefficients of the raw key polynomial.

15. The first network node as in claim 1,
wherein the first modulus (q) has as bit size of at least 12, or
wherein the second modulus (p) has as bit size of at least 7.

16. An electronic key agreement method for a first network node, the method comprising:
arranging digital communication between the first network node and a second network node;
obtaining a shared polynomial (a), the shared polynomial is shared with the second network node through the digital communication, coefficients of the shared polynomial a is selected modulo a first modulus q;
generating a private key polynomial ($sk_I$),
wherein coefficients of the private key polynomial are bounded in absolute value by a bound (s),
wherein the bound (s) is smaller than a second modulus (p),
wherein the second modulus (p) is smaller than the first modulus (q);
generating a public key polynomial ($pk_I$) wherein the generating comprises:
computing a polynomial product between the shared polynomial (a) and the private key polynomial ($sk_I$) modulo the first modulus (q) obtaining a polynomial product; and
scaling the coefficients of the polynomial product down to a second modulus (p), wherein a scaled coefficient is equal to the unscaled coefficient multiplied with the second modulus (p), divided by the first modulus (q) and rounded to the nearest integer;
sending the public key polynomial of the first network node to the second network node;
receiving a public key polynomial ($pk_R$) of the second network node;
computing a raw key polynomial as a polynomial product between the received public key of the second node and the private key polynomial of the first network node modulo the second modulus (p);
computing a shared key from the raw key;
receiving helper data of the second network node, wherein the helper data comprises information allowing deriving of the same shared key at the first and second node such that differences are cancelled between the raw keys derived at the first and second nodes; and
computing the shared key from the helper data and multiple coefficients of the raw key polynomial.

17. A computer readable program stored on a non-transitory medium, wherein the computer program when executed on a processor performs the method as follows:
arranging digital communication between the first network node and a second network node;
obtaining a shared polynomial (A), the shared polynomial is shared with the second network node through the digital communication, coefficients of the shared polynomial a is selected modulo a first modulus q;
generating a private key polynomial ($sk_I$),
wherein coefficients of the private key polynomial are bounded in absolute value by a bound (s),
wherein the bound (s) is smaller than a second modulus (p),
wherein the second modulus (p) is smaller than the first modulus (q);
generating a public key polynomial ($pk_I$) wherein the generating comprises:
computing a polynomial product between the shared polynomial (a) and the private key polynomial ($sk_I$) modulo the first modulus (q) obtaining a polynomial product; and
scaling the coefficients of the polynomial product down to a second modulus (p), wherein a scaled coefficient is equal to the unscaled coefficient multiplied with the second modulus (p), divided by the first modulus (q) and rounded to the nearest integer;
sending the public key polynomial of the first network node to the second network node;
receiving a public key polynomial ($pk_R$) of the second network node;
computing a raw key polynomial as a polynomial product between the received public key of the second node and the private key polynomial of the first network node modulo the second modulus (p);
computing a shared key from the raw key;
receiving helper data of the second network node, wherein the helper data comprises information allowing deriving of the same shared key at the first and second node such that differences are cancelled between the raw keys derived at the first and second nodes;
obtaining the shared key and the helper data from multiple coefficients of the raw key polynomial; and
sending the helper data to the second network node.

18. A first network node configured for a key agreement protocol, the first network node comprising:
a communication interface circuit, wherein the communication interface circuit is arranged for digital communication with a second network node; and
a processor circuit,
wherein the processor circuit is configured to obtain a shared polynomial (a), wherein coefficients of the shared polynomial (a) are selected modulo a first modulus q, wherein the processor circuit is configured to generate a private key polynomial ($sk_I$; $sk_R$), wherein coefficients of the private key polynomial are bounded in absolute value by a bound (s), wherein the bound (s) is smaller than a second modulus (p), wherein the second modulus (p) is smaller than the first modulus (q), wherein the processor circuit is configured to generate a public key polynomial ($pk_I$; $pk_R$) the generation comprising:

computing a polynomial product between the shared polynomial (a) and the private key polynomial ($sk_I$) modulo the first modulus (q) obtaining a polynomial product; and scaling coefficients of the polynomial product down to the second modulus (p), wherein a scaled coefficient is equal to the unscaled coefficient multiplied with the second modulus (p), divided by the first modulus (q) and rounded to the nearest integer, wherein the processor circuit is configured to send the public key polynomial of the first network node to the second network node, wherein the processor circuit is configured to receive a public key polynomial ($pk_R$; $pk_I$) of the second network node, wherein the processor circuit is configured to compute a raw key polynomial, wherein the raw polynomial is a polynomial product between the received public key of the second node and the private key polynomial of the first network node modulo the second modulus (p), wherein the processor circuit is configured to compute a shared key from the raw key, wherein the first network node is configured to receive reconciliation data (h) of the second network node, wherein the first network node is configured to obtain the shared key and reconciliation data from multiple coefficients of the raw key polynomial, wherein the first network node is configured to send the reconciliation data to the second network node.

19. The first network node as in claim 18, wherein the first network node is configured to receive helper data of the second network node, wherein the helper data comprises information allowing deriving of the same shared key at the first and second node such that differences are cancelled between the raw keys computed at the first and second nodes, wherein the first network node is configured to obtain the shared key, wherein the first network node is configured to obtain the helper data from at least multiple coefficients of the raw key polynomial, wherein the first network node is configured to send the helper data to the second network node.

20. An electronic key agreement method for a first network node, the method comprising:

arranging digital communication between the first network node and a second network node;

obtaining a shared polynomial (a), the shared polynomial is shared with the second network node through the digital communication, coefficients of the shared polynomial a is selected modulo a first modulus q;

generating a private key polynomial ($sk_I$), wherein coefficients of the private key polynomial are bounded in absolute value by a bound (s), wherein the bound (s) is smaller than a second modulus (p), wherein the second modulus (p) is smaller than the first modulus (q);

generating a public key polynomial ($pk_I$) wherein the generating comprises:

computing a polynomial product between the shared polynomial (a) and the private key polynomial ($sk_I$) modulo the first modulus (q) obtaining a polynomial product; and scaling the coefficients of the polynomial product down to a second modulus (p), wherein a scaled coefficient is equal to the unscaled coefficient multiplied with the second modulus (p), divided by the first modulus (q) and rounded to the nearest integer;

sending the public key polynomial of the first network node to the second network node;

receiving a public key polynomial ($pk_R$) of the second network node;

computing a raw key polynomial as a polynomial product between the received public key of the second node and the private key polynomial of the first network node modulo the second modulus (p);

computing a shared key from the raw key;

receiving helper data of the second network node, wherein the helper data comprises information allowing deriving of the same shared key at the first and second node such that differences are cancelled between the raw keys derived at the first and second nodes;

obtaining the shared key and the helper data from multiple coefficients of the raw key polynomial; and sending the helper data to the second network node.

\* \* \* \* \*